United States Patent
Rokicki et al.

(10) Patent No.: US 8,301,687 B2
(45) Date of Patent: Oct. 30, 2012

(54) SYSTEMS AND/OR METHODS FOR STANDARDS-BASED MESSAGING

(75) Inventors: Derek Rokicki, Western Springs, IL (US); Elliot Holar, Arlington, VA (US)

(73) Assignee: Software AG, Darmstadt (DE)

(*) Notice: Subject to any disclaimer, the term of this patent is extended or adjusted under 35 U.S.C. 154(b) by 724 days.

(21) Appl. No.: 12/385,104

(22) Filed: Mar. 31, 2009

(65) Prior Publication Data

US 2010/0251262 A1 Sep. 30, 2010

(51) Int. Cl.
*G06F 15/16* (2006.01)
(52) U.S. Cl. .......................................... 709/201
(58) Field of Classification Search .................. 709/201, 709/230
See application file for complete search history.

(56) References Cited

U.S. PATENT DOCUMENTS

| | | |
|---|---|---|
| 4,556,974 A | 12/1985 | Kozlik |
| 4,604,686 A | 8/1986 | Reiter et al. |
| 4,649,535 A | 3/1987 | Ulug |
| 4,682,326 A | 7/1987 | Ulug |
| 4,689,786 A | 8/1987 | Sidhu et al. |
| 4,725,834 A | 2/1988 | Chang et al. |
| 4,745,598 A | 5/1988 | Ulug |
| 4,777,595 A | 10/1988 | Strecker et al. |
| 4,789,982 A | 12/1988 | Coden |
| 4,797,881 A | 1/1989 | Ben-Artzi |
| 4,811,334 A | 3/1989 | Matt |
| 4,930,123 A | 5/1990 | Shimizu |
| 4,975,914 A | 12/1990 | Ashton et al. |
| 5,109,515 A | 4/1992 | Laggis et al. |
| 5,136,716 A | 8/1992 | Harvey et al. |
| 5,218,697 A | 6/1993 | Chung |
| 5,224,098 A | 6/1993 | Bird et al. |
| 5,249,290 A | 9/1993 | Heizer |
| 5,249,293 A | 9/1993 | Schreiber et al. |

(Continued)

FOREIGN PATENT DOCUMENTS

EP 0 600 235 10/1993

(Continued)

OTHER PUBLICATIONS

"Java Message Service API Tutorial", Kim Haase, Sun Microsystems, Inc., Aug. 2001, pp. 1-278.

(Continued)

*Primary Examiner* — Jason Recek
(74) *Attorney, Agent, or Firm* — Nixon & Vanderhye PC

(57) ABSTRACT

The example embodiments disclosed herein relate to application integration techniques built around the publish-and-subscribe model (or one of its variants). In certain example embodiments, a first standards-based messaging protocol (e.g., the JMS messaging protocol) may be used to create a trigger so that a message envelope according to a second standards-based messaging protocol (e.g., SOAP) may be communicated over the first standards-based messaging transport layer. In other words, in certain example embodiments, a trigger according to a first protocol (e.g., JMS) may have a message according to a second protocol (e.g., SOAP) associated therewith so as to enable the message to be communicated over the first protocol's transport layer. The trigger may be configured to receive a message from a web service consumer via the JMS messaging protocol and pass it to the web service stack for dispatch to the web service provider. Similarly, for a request-reply web service exchange pattern, the trigger may be configured to send the reply message from the web service provider, as returned by the web service layer, to the web service consumer via the JMS messaging protocol.

25 Claims, 13 Drawing Sheets

U.S. PATENT DOCUMENTS

| | | | |
|---|---|---|---|
| 5,257,369 | A | 10/1993 | Skeen et al. |
| 5,265,250 | A | 11/1993 | Andrade et al. |
| 5,280,610 | A | 1/1994 | Travis, Jr. et al. |
| 5,313,581 | A | 5/1994 | Giokas et al. |
| 5,329,619 | A | 7/1994 | Page et al. |
| 5,341,477 | A | 8/1994 | Pitkin et al. |
| 5,408,602 | A | 4/1995 | Giokas et al. |
| 5,497,463 | A | 3/1996 | Stein et al. |
| 5,524,253 | A | 6/1996 | Pham et al. |
| 5,546,584 | A | 8/1996 | Lundin et al. |
| 5,557,798 | A | 9/1996 | Skeen et al. |
| 5,812,768 | A | 9/1998 | Page et al. |
| 2002/0116248 | A1 | 8/2002 | Amit et al. |
| 2003/0097457 | A1 | 5/2003 | Saran et al. |
| 2006/0034237 | A1* | 2/2006 | Patrick et al. ........... 370/338 |
| 2006/0069777 | A1* | 3/2006 | Kato et al. .............. 709/225 |
| 2006/0248189 | A1 | 11/2006 | Jerrard-Dunne et al. |
| 2009/0024514 | A1* | 1/2009 | Kumaran et al. ......... 705/37 |
| 2009/0064182 | A1 | 3/2009 | Holar et al. |
| 2010/0161821 | A1* | 6/2010 | Slamkovic ............... 709/230 |

FOREIGN PATENT DOCUMENTS

| | | |
|---|---|---|
| EP | 1 528 710 | 5/2005 |
| WO | WO 91/05417 | 4/1991 |

OTHER PUBLICATIONS

"Guarantee Inter-Enterprise Message Delivery Using JMS", Gopalan Suresh Raj, Java Report, SIGS Publications, New York, vol. 5, No. 8, Aug. 2000.

"JMS and CORBA Notification Interworking", Steve Trythall, Internet Citation, Dec. 12, 2001.

European Search Report issued for European Patent Application No. 09159340.0-1244, dated Dec. 11, 2009.

Curbera et al., "Unraveling the Web Services Web, An Introduction to SOAP, WSDL, and UDDI," XP-011094337; IEEE Internet Computing, Mar./Apr. 2002, pp. 86-93.

Titheridge, "Using JMS Connection Pooling With WebSphere Application Server and WebSphere MQ, Part 1," XP-002558629; Aug. 8, 2007, pp. 1-15 (retrieved on Dec. 3, 2009 from the Internet at http://www.ibm.com/developerworks/websphere/library/techarticles/0707_titheridge/0707_titheridge.html).

Du et al., "Building a JMS Web Service Using SOAP Over JMS and WebSphere Studio," XP-002558628; Feb. 1, 2004, pp. 1-15 (retrieved on Dec. 3, 2009 from the Internet at http://www.ibm.com/developerworks/websphere/library/techarticles/0402_du/0402_du.html).

* cited by examiner

SYSTEMS AND/OR METHODS FOR STANDARDS-BASED MESSAGING

CROSS-REFERENCE TO RELATED APPLICATION

This application hereby incorporates by reference the entire contents of co-pending and commonly assigned U.S. application Ser. No. 11/896,310.

FIELD OF THE INVENTION

The example embodiments disclosed herein relate to application integration techniques and, more particularly, to application integration techniques built around the publish-and-subscribe model (or one of its variants). In certain example embodiments, a first standards-based messaging protocol (e.g., the JMS messaging protocol) may be used to create a trigger so that a message envelope according to a second standards-based messaging protocol (e.g., SOAP) may be communicated over the first standards-based messaging transport layer. In other words, in certain example embodiments, a trigger according to a first protocol may have a message according to a second protocol associated therewith so as to enable the message to be communicated over the first protocol's transport layer. A configuration-driven approach may be implemented in certain example embodiments so as to provide for such functionality while also offering certain value-added features.

BACKGROUND AND SUMMARY OF EXAMPLE EMBODIMENTS OF THE INVENTION

Companies today are tasked with implementing solutions for many types of integration challenges within their respective enterprises. Many of these challenges involve issues of application integration (e.g., integration among and/or between software applications and/or other systems) and fall into common patterns.

For example, a first area relates to propagation of similar business objects from one system to multiple other systems, such as, for example, in an order status change or a product price change. A second area relates to synchronization of similar business objects between two or more systems to obtain a single view, such as, for example, a real-time synchronization of customer, product registration, product order, and product SKU information among several applications. This is the most common issue requiring an integration solution. In a one-way synchronization, there generally is one system (e.g., resource) that acts as a data source and one or more resources that are targets of the synchronization. In a two-way synchronization, every resource often is both a potential source and target of a synchronization. There generally is not a single resource that acts as the primary data resource. Thus, a change to any resource should be reflected in all other resources. A third area involves information joined from multiple sources into a common destination system, such as, for example, communicating pharmacy customer records and prescription transactions and website data into a central application and database.

Various tools have been provided that enable a user to design and deploy solutions that address these challenges using, for example, the publish-and-subscribe model or one of its variants. The publish-and-subscribe model is a specific type of message-based solution in which messages are exchanged anonymously through a message broker. Applications that produce information that needs to be shared make this information available in specific types of recognizable documents that they publish to the message broker. Applications that require information subscribe to the document types they need.

At run time, the message broker receives documents from publishers and then distributes the documents to subscribers. The subscribing application processes or performs work using the document and may or may not send a response to the publishing application.

In a typical system, an integration server or applications running on an integration server publish documents to a broker. The broker then routes the documents to subscribers located on other integration servers. The integration server and the broker share a fast, efficient process for exchanging documents across the entire system.

Although such techniques have been successful in providing solutions to the above-described challenge areas, further enhancements are still possible. For example, the integration server (IS) "Trigger Subsystem" provides a rich infrastructure for message processing (e.g., asynchronous message processing). However, this functionality is only available for messaging over a proprietary (e.g., broker) messaging protocol. Thus, users currently have to make a difficult design decision, choosing between either a feature-rich proprietary protocol, or a standards-based interoperable messaging protocol (e.g., JMS).

One approach to solving this problem has involved the use of a JMS adapter provided to an integration server. Thus, both a proprietary "trigger subsystem" (provided by the integration server for proprietary messaging) and a separate JMS adapter were provided to the integration server.

Unfortunately, this approach is somewhat incomplete. In particular, despite the availability of a JMS adapter for standards-based interoperable messaging, the "trigger subsystem" capabilities could not be fully used in connection with JMS. That is, users who want the extended capabilities of the "trigger subsystem" while using the JMS adapter would have to custom-implement those capabilities in their applications for every new application. This often imposes significant configuration and programming requirements and has led to a plethora of non-standardized implementations of the same and/or similar functionality. This problem is further exacerbated, as JMS is still in the process of being standardized for use in the in web-services context. In essence, this means that if capabilities comparable to those of the proprietary broker were required, they would have to be implemented in the application services layer time and time again. Even where such approaches have been implemented, they have not been standardized, e.g., because enterprises are different in terms of their organizations, processes, requirements, infrastructure, etc.

Thus, a problem remains in that there is not a single means to couple the current "trigger subsystem" and all of its capabilities with standards-based messaging (e.g., via JMS). Accordingly, there remains a tradeoff between a feature-rich proprietary protocol on the one hand, and a standards-based interoperable messaging protocol (e.g., JMS) on the other.

Thus, it will be appreciated that there is a need in the art for improved techniques for providing application integration solutions in one or more of the above-noted and/or other areas.

One aspect of certain example embodiments of this invention relates to a messaging layer that provides a rich feature set for addressing application integration challenges that is accessible through both proprietary and open messaging constructs existing outside of the application layer. In certain example embodiments, such messaging constructs may be in the form of "triggers," and such triggers may enable a publish-and-subscribe type solution to such application integration challenges in certain example embodiments. The triggers of certain example embodiments may be JMS triggers.

Another aspect of certain example embodiments relates to parallel subsystems being accessible through a common trigger subsystem provided as value-added layer above the respective trigger subsystems.

Still another aspect of certain example embodiments relates to substantially fully embedding JMS as a peer to the proprietary messaging protocol in the integration server trigger subsystem so that all or substantially all existing capabilities would be JMS-enabled.

A further aspect of certain example embodiments relates to the use of a messaging layer that enables JMS messaging without the use of a special adapter provided to an integration server. Furthermore, in certain example embodiments, such a messaging layer may make it possible to avoid making any changes to the JMS trigger itself and/or may reduce the need for custom programming and/or implementation at the application service level in certain example cases.

In certain example embodiments, a trigger subsystem for use with an application integration system is provided. At least one proprietary trigger subsystem is embedded in the trigger subsystem. At least one standards-based trigger subsystem is substantially fully embedded in the trigger subsystem. Common trigger facilities are provided for the at least one proprietary trigger subsystem and the at least one standards-based trigger subsystem. The at least one proprietary trigger subsystem and the at least one standards-based trigger subsystem are provided as parallel subsystems. Each said proprietary trigger subsystem and each said standards-based trigger subsystem is configured to access a corresponding trigger layer. Each said trigger layer is configured to provide triggers in a format associated with the respective trigger layer. The triggers include instructions for causing a process to be executed in or by the application integration system or a component thereof.

In certain other example embodiments, there is provided a messaging layer for use across an integration server or an integration server instance provided as a component in an application integration system. A trigger subsystem includes at least one proprietary trigger subsystem embedded therein, at least one standards-based trigger subsystem substantially fully embedded therein, and common trigger facilities for the at least one proprietary trigger subsystem and the at least one standards-based trigger subsystem. The at least one proprietary trigger subsystem and the at least one standards-based trigger subsystem are provided as parallel subsystems in the trigger subsystem. A plurality of parallel trigger layers is respectively provided for each said proprietary trigger subsystem and each said standards-based trigger subsystem. A plurality of messaging API layers is respectively provided for each said proprietary trigger subsystem and each said standards-based trigger subsystem. Each said trigger layer is configured to provide triggers in a format associated with the respective trigger layer. The triggers include instructions for causing a process to be executed in or by the application integration system or a component thereof.

According to certain example embodiments, a method of configuring an application integration system is provided. There is provided a messaging layer for use across an integration server or an integration server instance provided as a component in the application integration system. In the messaging layer, a trigger subsystem is included. At least one proprietary trigger subsystem is embedded in the trigger subsystem. At least one standards-based trigger subsystem is substantially fully embedded in the trigger subsystem. The trigger subsystem is configured to provide common trigger facilities for the at least one proprietary trigger subsystem and the at least one standards-based trigger subsystem. A plurality of trigger layers is respectively provided for each said proprietary trigger subsystem and each said standards-based trigger subsystem. A plurality of messaging API layers is respectively provided for each said proprietary trigger subsystem and each said standards-based trigger subsystem. The at least one proprietary trigger subsystem and the at least one standards-based trigger subsystem are provided as parallel subsystems in the trigger subsystem. Each said trigger layer is configured to provide triggers in a format associated with the respective trigger layer. The triggers include instructions for causing a process to be executed in or by the application integration system or a component thereof.

According to certain other example embodiments, there is provided a method of operating an application integration system based on a publish-and-subscribe model or a variant of the publish-and-subscribe model. There is provided a messaging layer for use across an integration server or an integration server instance provided as a component in the application integration system. The messaging layer includes a trigger subsystem included therein, with the trigger subsystem comprising at least one proprietary trigger subsystem embedded therein and at least one standards-based trigger subsystem substantially fully embedded therein, and with the trigger subsystem being configured to provide common trigger facilities for the at least one proprietary trigger subsystem and the at least one standards-based trigger subsystem. Also included in the messaging layer is a plurality of trigger layers respectively provided for each said proprietary trigger subsystem and each said standards-based trigger subsystem, with each said trigger layer being configured to provide triggers in a format associated with the respective trigger layer. In the triggers, instructions are included for establishing subscriptions to publishable document types and for specifying one or more services to process documents received by the subscriptions. One or more documents are published to one or more subscribers in dependence on the instructions included in the corresponding trigger(s). Each said document is processed in dependence on the instructions included in the corresponding trigger(s). The at least one proprietary trigger subsystem and the at least one standards-based trigger subsystem are provided as parallel subsystems in the trigger subsystem.

Although these features, aspects, and example embodiments are advantageous, further improvements are still possible. For example, it would be desirable to use the standards-based triggers to process messages of the same or different types over the triggers' transport layer. That is, it would be advantageous to use a first standards-based messaging protocol (e.g., the JMS messaging protocol) to create a trigger so that a message envelope according to a second standards-based messaging protocol (e.g., SOAP) may be communicated over the first standards-based messaging transport layer. This approach enables a user to potentially realize the benefits of associated with both the standards-based trigger as well as the standards-based messages. It would be further desirable to implement a standards-based and configuration-driven approach to such techniques. For example, a standards-based and configuration-driven approach to such techniques could be implemented in accordance with a binding specification that links or binds the standards-based triggers to the second standards-based messaging protocol.

Thus, it will be appreciated that there is a need to move away from proprietary implementations and towards standards-based and configuration-driven approaches to messaging that involve using standards-based triggers to enable other message type envelopes to be sent over triggers' transport layers.

One advantageous protocol for the messages is SOAP. As is known, SOAP is a lightweight protocol for the exchange of information in a decentralized, distributed environment. SOAP is an XML-based protocol that includes three parts: an envelope that defines a framework for describing what is in a message and how it is to be processed, a set of encoding rules for expressing instances of application-defined data types, and a convention for representing remote procedure calls and responses. SOAP messages may be used, for example, to exchange structured information in the implementation of web services in computer networks.

Unfortunately, current products do not offer a standards-based and configuration-driven approach for processing SOAP messages over the JMS transport. Indeed, if any SOAP over JMS messaging approaches were provided, they necessarily would have to rely on proprietary technology rather than a standards-based and configuration-driven approach. This is due, in part, to the fact that a working draft for the SOAP over JMS 1.0 specification has only just recently been released by the W3C and that web service solution providers other than the assignee of the instant invention generally are not deeply invested in providing standards-based and configuration- driven approaches to messaging. A copy of the recently released "last call" W3C specification can be found online. The absence of such a binding specification between SOAP and JMS has made it impossible to implement a standards-based and configuration-driven approach to providing such features. Thus, even if web services solution providers were interested in standards-based and configuration-driven protocols, they could not do so reliably and predictably.

Accordingly, it is believed that the state of the art relies on proprietary bindings, which disadvantageously lock users in to closed systems that may not necessarily be changeable and extensible, and which even might run afoul of any standards ultimately promulgated by a standards-setting organization such as the W3C.

Accordingly, one aspect of certain example embodiments relates to providing a standards-based and configuration-driven approach to messaging where a first standards-based messaging protocol is used to create a trigger so that a message envelope according to a second standards-based messaging protocol may be communicated over the first standards-based messaging transport layer. In other words, in certain example embodiments, a trigger according to a first protocol may have a message according to a second protocol associated therewith so as to enable the message to be communicated over the first protocol's transport layer.

Another aspect of certain example embodiments relates to providing support for processing SOAP messages over the JMS transport.

Certain example embodiments relate to an application integration system configured to exchange messages via a message broker. A runtime trigger is configured to receive messages from a message producer via a client queue of the message broker in accordance with a context retrieved from a context pool. The message is received over a transport protocol and a message envelope is associated therewith. The message envelope is formatted in accordance with a second messaging protocol. The runtime trigger is further configured to extract the message envelope from the runtime transported message. A web service stack is configured to receive the message envelope extracted from the transported message by the runtime trigger and is further configured to invoke an appropriate service from a plurality of possible services in accordance with instructions included with the message envelope.

Certain example embodiments relate to an application integration system configured to exchange messages via a message broker. A web service connector is configured to invoke a remote web service by generating a runtime message envelope to be delivered to the web service stack for transport to a client queue of the message broker. The message is sent over a transport protocol and has a message envelope associated therewith. The message envelope is formatted in accordance with a second messaging protocol. The web service connector is generated from a web service descriptor (WSD). The WSD specifies at least a format of the message envelope, as well as a destination (e.g., a JMS destination). Optionally, one or more network locations at which the web service can be invoked. The message broker is configured to place any received messages into the client queue for the message consumer.

Certain example embodiments relate to an application integration system configured to exchange messages via a message broker. A web service connector is configured to invoke a remote web service by generating a runtime message envelope to be delivered to the web service stack for transport to a client queue of the message broker. The message is sent over a transport protocol and has a message envelope associated therewith. The message envelope is formatted in accordance with a second messaging protocol. The message consumer (or runtime trigger) is configured to receive the runtime message from the producer in accordance with a context retrieved from a context pool. The message consumer is further configured to extract the message envelope from the transported runtime message. A web service stack is configured to receive the message envelope extracted from the transported runtime message by the message consumer and is further configured to invoke an appropriate service from a plurality of possible services in accordance with instructions included with the message envelope. The web service connector is generated from a web service descriptor (WSD) at design time. The WSD specifies at least a format of the runtime message envelope, as well as one or more network locations at which the web service can be invoked. The message broker is configured to place any received runtime messages into the client queue for the message consumer.

Certain example embodiments relate to a messaging method in an application integration system. A message broker configured to deliver messages from a message producer to a message consumer is provided. A web service connector is enabled, with the web service connector being configured to invoke a remote web service in communication with the message consumer by generating a runtime message envelope to be delivered to the web service stack for transport to a client queue of the message broker. The runtime message is sent to the message broker via a dispatcher connected to the web service connector using a connection retrieved from a connection pool, with the runtime message being sent over a transport protocol and having a message envelope associated therewith, and with the message envelope being formatted in accordance with a second messaging protocol. The runtime message from the producer is received at the message consumer via the broker in accordance with a context retrieved from a context pool. The message envelope is extracted from the transported runtime message. The message envelope is passed from the message consumer to a web service stack. An appropriate service is invoked via the web service stack from a plurality of possible services operably connected to the web service stack in accordance with instructions included with the message envelope. The message broker is configured to place any received runtime messages into the client queue for the message consumer.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

A description of an illustrative application integration system and its example methods of operation will now be provided. It will be appreciated that the following description is provided by way of example and without limitation. Indeed, the implementations set forth below reflect the general techniques associated with one publish-and-subscribe approach to providing application integration solutions developed by the assignee of the instant application, which may be used in connection with the messaging layer, triggers, and trigger subsystems of certain example embodiments.

Figure 1:
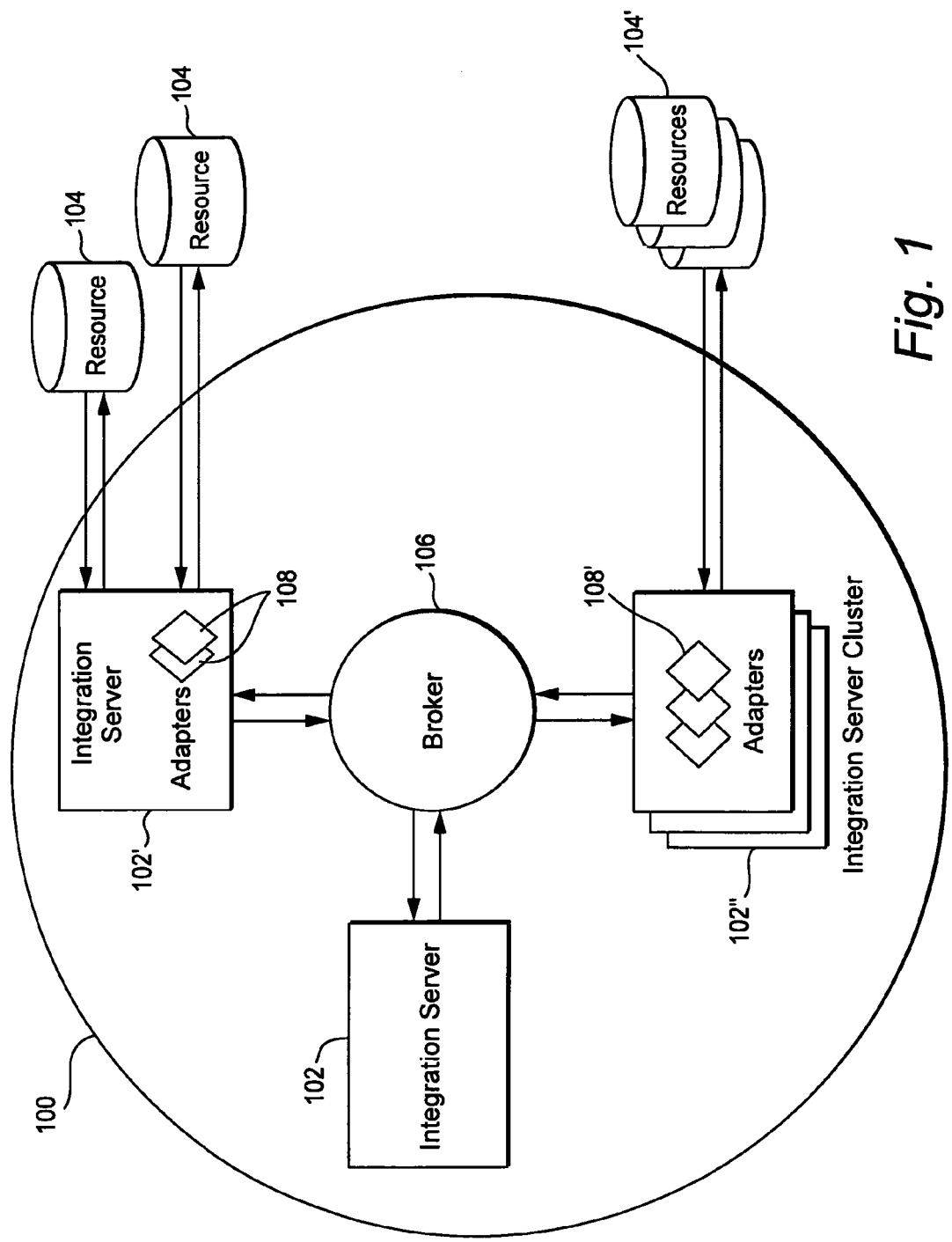
FIG. 1 is a schematic view of an illustrative application integration system.

Referring now more particularly to the drawings, FIG. 1 is a schematic view of an illustrative application integration system 100. A plurality of integration servers 102 are shown, each being in communication with a broker 106. A first integration server 102 is shown, as is a second integration server 102', which includes a plurality of adapters 108. An integration server cluster 102" also is shown, and it includes a plurality of adapters 108' provided thereto.

In general, the integration server is the system's central run-time component. It serves as the entry point for the systems and applications to be integrated, and it is the system's primary engine for the execution of integration logic. It also provides the underlying handlers and facilities that manage the orderly processing of information from resources 104 (or clustered resources 104') inside and/or outside the enterprise. The integration server 102 publishes documents to and receives documents from the broker.

The broker 106 forms the potentially globally scalable messaging backbone of the example components described herein. It provides the infrastructure for implementing asynchronous, message-based solutions that are built on the publish-and-subscribe model or one of its variants, such as, for example, request/reply, publish-and-wait, and the like.

The broker 106 routes documents between information producers (e.g., publishers) and information consumers (e.g., subscribers). Thus, the broker 106 receives, queues, and delivers documents. The broker 106 maintains a registry of document types that it recognizes. It also maintains a list of subscribers that are interested in receiving those types of documents. When the broker 106 receives a published document, it queues it for the subscribers of that document type. Subscribers retrieve documents from their queues. This action usually triggers an activity on the subscriber's system that processes the document.

Multiple brokers 106 optionally may be provided to a system 100. Multiple brokers 106 can operate in groups, called territories, which allow several brokers 106 to share document type and subscription information.

The following is a description of the basic building blocks of an integration solution that uses the publish-and-subscribe model. These building block include, for example, documents, publishable document types, triggers, services, adapter notifications, and canonical documents.

In an integration solution built on the publish-and-subscribe model, applications publish and subscribe to documents. Documents are objects that the above-noted components may use to encapsulate and exchange data. A document represents the body of data that a resource passes to the components. Often, it represents a business event, such as, for example, placing an order (e.g., via a purchase order document), shipping goods (e.g., via a shipping notice), adding a new employee (e.g., via a new employee record), etc.

Each published document includes an envelope. The envelope is much like a header in an email message. The envelope records information, such as, for example, the sender's address, the time the document was sent, sequence numbers, and/or other useful information for routing and control. It includes information about the document and its transit through the system.

Every published document is associated with a publishable document type. A publishable document type is a named schema-like definition that describes the structure of a particular kind of document that can be published and subscribed to. An instance of a publishable document type can be published locally within an integration server or can be published to a broker. In a publication environment that includes a broker, each publishable document type may be bound to a broker document type. Clients on the broker subscribe to publishable document types. The broker uses publishable document types to determine which clients to distribute documents to.

Within the publish-and-subscribe model of certain example embodiments described herein, triggers establish subscriptions to publishable document types. Triggers also specify the services that will process documents received by the subscription. Within a trigger, a condition associates one or more publishable document types with a service.

Services are method-like units of work. They contain program logic that the integration server executes. Services may be built to carry out work, such as, for example, extracting data from documents, interacting with back-end resources, publishing documents to the broker, etc. When a trigger is built, a user may specify the service to be used to process the subscribed-to documents.

Adapter notifications notify the system whenever a specific event occurs on an adapter's resource. The adapter notification publishes a document when the specified event occurs on the resource. Each adapter notification has an associated publishable document type. Triggers may be used to subscribe to the publishable document types associated with adapter notifications. The service associated with the publishable document type in the trigger condition may, for example, perform some additional processing, updating, and/or synchronization, e.g., based on the contents of the adapter notification.

A canonical document is a standardized representation that a document may assume while it is passing through the system. A canonical document acts as the intermediary data format between resources. For example, in an implementation that accepts purchase orders from companies, one of the steps in the process may convert the purchase order document to a company's standard purchase order format. This format is called the "canonical" form of the purchase order document. The canonical document is published, delivered, and passed to services that process purchase orders.

By converting a document to a neutral intermediate format, subscribers (e.g., adapter services) only need to know how to convert the canonical document to the required application format. If canonical documents were not used, every subscriber would have to be able to decode the native document format of every publisher.

A canonical document is a publishable document type. The canonical document may be used when building publishing services and subscribed to when building triggers. In flow services, documents may be mapped from the native format of an application to the canonical format.

An overview of illustrative publish-and-subscribe paths is now provided with reference to FIGS. 2-7. As noted above, integration servers exchange documents via publication and subscription. One integration server publishes a document, and one or more integration servers subscribe to and process that document. The integration server generally interacts with the broker to publish and subscribe to documents. For example, an integration server may publish documents to the broker, an integration server may retrieve documents from the broker, and/or an integration server may publish and subscribe to documents locally.

When the integration server is configured to connect to a broker, the integration server can publish documents to the broker. The broker then routes the documents to all of the subscribers. Three example publishing path scenarios are explained below: a document is published to the broker, a document is published to the broker when the broker is not available, and a document is published to the broker and a reply is waited for (e.g., as in a request/reply scenario). If a broker is not configured for the integration server, all publishes may become local publishes, and delivering documents to a specific recipient is not available. This possibility is described in greater detail below.

Figure 2:
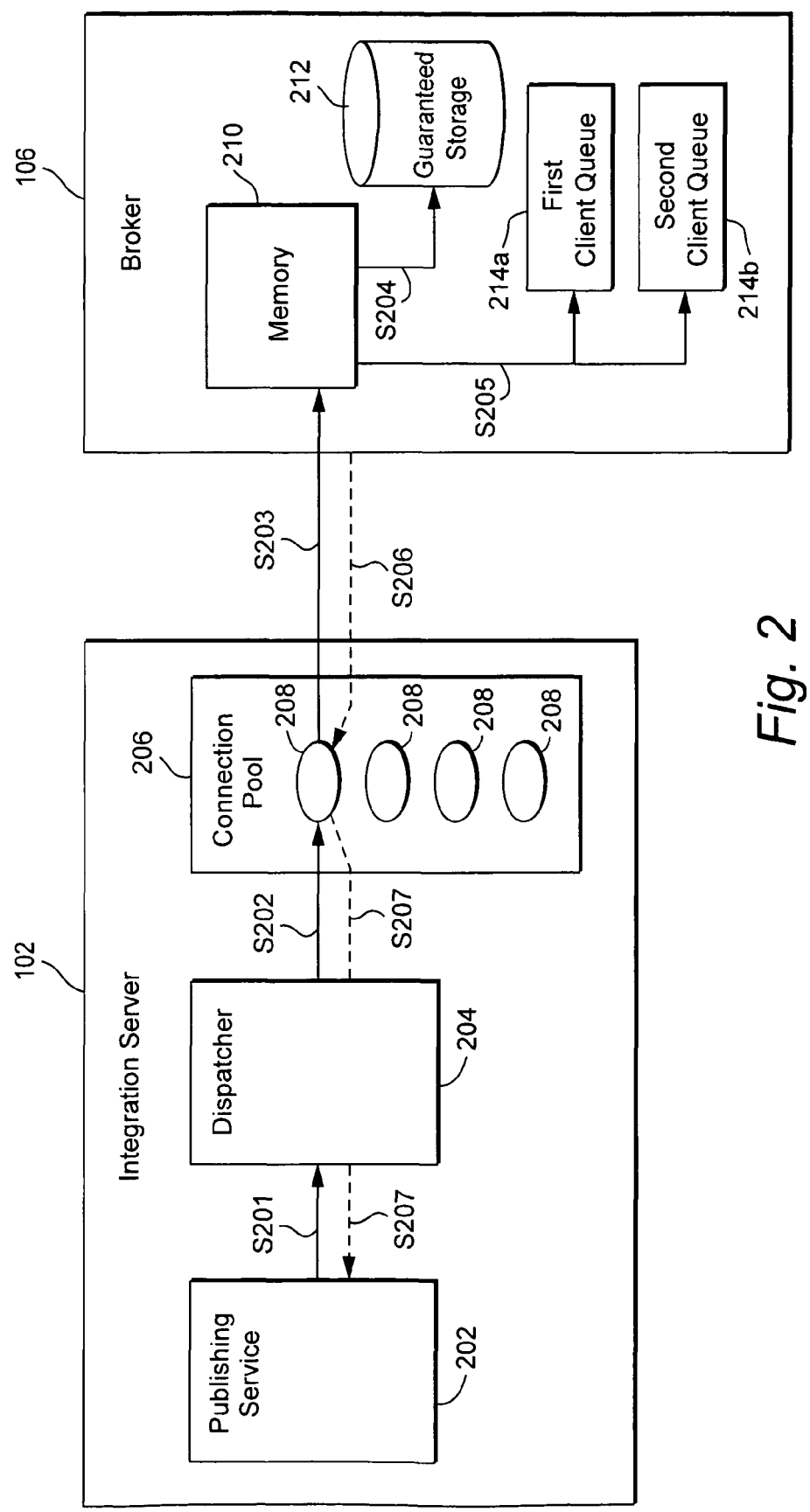
FIG. 2 is a block diagram that illustrates how the integration server publishes or delivers documents to the broker when the broker is connected.

FIG. 2 is a block diagram that illustrates how the integration server publishes or delivers documents to the broker when the broker is connected. When the integration server sends documents to a configured broker, the integration server either publishes or delivers the document. When the integration server publishes a document, it may be broadcast to all subscribers. The broker routes the document to all clients that have subscribed to that document. When the integration server delivers a document, the delivery request identifies the document recipient. The broker places the document in the queue for the specified client only.

A publishing service 202 provided to the integration server 102 sends a document to the dispatcher 204 (or an adapter notification publishes a document when an event occurs on the resource the adapter monitors) (S201). Before the integration server 102 sends the document to the dispatcher 204, it validates the document against its publishable document type. If the document is not valid, the service 202 returns an exception specifying the validation error. The dispatcher 204 obtains a connection 208 from the connection pool 206 (S202). The connection pool 206 is a reserved set of connections 208 that the integration server 102 uses to publish documents to the broker 106. To publish a document to the broker 106, the integration server 102 uses a connection 208 for the default client. The dispatcher 204 sends the document to the broker 106 (S203).

The broker 106 examines the storage type for the document to determine how to store the document (S204). For example, if the document is volatile, the broker 106 may store the document in a memory location 210. If the document is guaranteed, the broker 106 may instead store the document in memory 210 and/or on disk 212.

The broker 106 routes the document to subscribers (S205). If the document was published (e.g., broadcast), the broker 106 identifies subscribers and places a copy of the document in the client queue for each subscriber (e.g., both first and second client queues 214a-b). If the document was delivered, the broker 106 places the document in the queue for the client specified in the delivery request (e.g., either first and second client queues 214a-b). If there are no subscribers for the document, the broker 106 returns an acknowledgement to the publisher 202 and then discards the document. If, however, a deadletter subscription exists for the document, the broker 106 deposits the document in the queue containing the deadletter subscription (e.g., either or both of first and second client queues 214a-b). A document remains in the queue (e.g., either or both of first and second client queues 214a-b) on the broker 106 until it is picked up by the subscribing client. If the time-to-live for the document elapses, the broker 106 discards the document. The time-to-live period may be predetermined, e.g., by the user. If the document is guaranteed, the broker 106 returns an acknowledgement to the dispatcher 204 to indicate successful receipt and storage of the document (S206). The dispatcher 204 returns the connection 208 to the connection pool 206. The integration server 102 returns control to the publishing service 202, which executes the next step (S207).

It is possible to configure publishable document types and the integration server 102 so that integration server 102 does not validate documents when they are published. Also, if a transient error occurs while the integration server 102 publishes a document, the audit subsystem may log the document and assign it a status of "FAILED." A transient error is an error that arises from a condition that might be resolved quickly, such as, for example, the unavailability of a resource related to network issues or failure to connect to a database. A monitor may be used to find and resubmit documents with a status of "FAILED."

Figure 3:
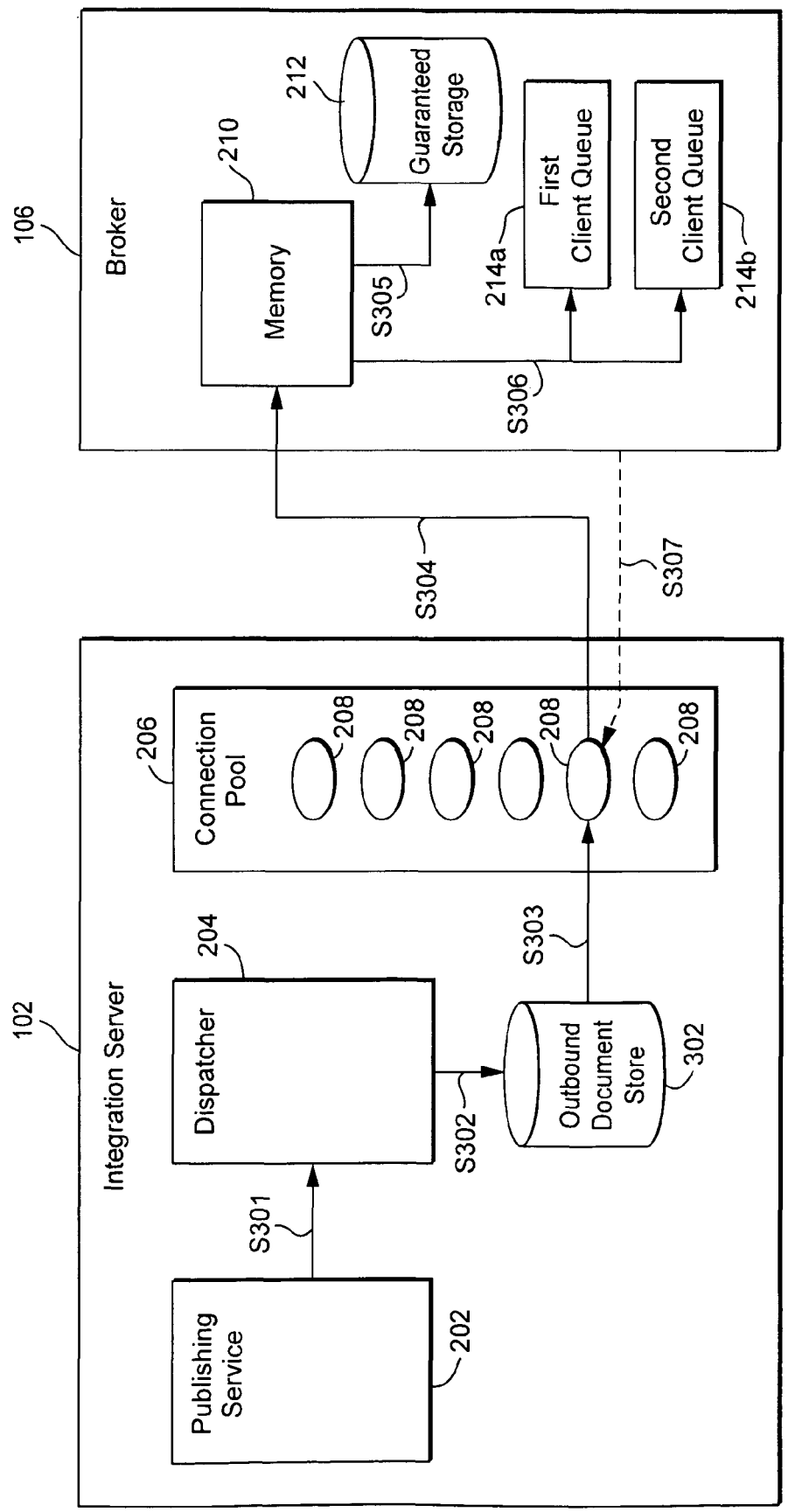
FIG. 3 is a block diagram that illustrates how the integration server publishes documents when the broker is not available.

FIG. 3 is a block diagram that illustrates how the integration server publishes documents when the broker is not available. In brief, the integration server 102 constantly monitors its connection 208 to the broker 106 and may alter the publishing path if it determines that the configured broker 106 is not available. If the broker 106 is not connected, the integration server 106 may route guaranteed documents to an outbound document store 302. The documents may remain in the outbound document store 302 until the connection 208 to the broker 106 is re-established.

A publishing service 202 provided to the integration server 102 sends a document to the dispatcher 204 (or an adapter notification publishes a document when an event occurs on the resource the adapter monitors) (S301). Before the integration server 102 sends the document to the dispatcher 204, it validates the document against its publishable document type. If the document is not valid, the service 202 returns an exception specifying the validation error. The dispatcher 204 detects that the broker 106 is not available. Accordingly, the document may be stored. For example, if the document is guaranteed, the dispatcher 204 routes the document to the outbound document store 302 (e.g., on disk). If the document is volatile, the dispatcher 204 discards the document and the publishing service 202 throws an exception. The integration server 102 executes the next step in the publishing service.

When the integration server 102 re-establishes a connection to the broker 106, the integration server 102 obtains a single connection 208 from the connection pool 206 (S303). The integration server 102 automatically sends the documents from the outbound document store 302 to the broker 106 (S304). To empty the outbound document store 302 more rapidly, the integration server 102 may send the documents in batches instead of one at a time. It will be appreciated that the integration server 102 may use a single connection 208 to empty the outbound document store 302, for example, to preserve publication order.

The broker 106 examines the storage type for the document, determines that it is guaranteed, and stores the document in memory 210 and on disk 212 (S305). The broker 106 routes the document to subscribers (S306). If the document was published (e.g., broadcast), the broker 106 identifies subscribers and places a copy of the document in the client queue for each subscriber (e.g., both first and second client queues 214a-b). If the document was delivered, the broker 106 places the document in the queue for the client specified in the delivery request (e.g., either first and second client queues 214a-b). If there are no subscribers for the document, the broker 106 returns an acknowledgement to the publisher 202 and then discards the document. If, however, a deadletter subscription exists for the document, the broker 106 deposits the document in the queue containing the deadletter subscription (e.g., either or both of first and second client queues 214a-b). A document remains in the queue (e.g., either or both of first and second client queues 214a-b) on the broker 106 until it is picked up by the subscribing client. If the time-to-live for the document elapses, the broker 106 discards the document. The time-to-live period may be predetermined, e.g., by the user. If the document is guaranteed, the broker 106 returns an acknowledgement to the dispatcher 204 to indicate successful receipt and storage of the document (S206). The dispatcher 204 returns the connection 208 to the connection pool 206. The broker 106 returns an acknowledgement to the integration server 102 to indicate successful receipt and storage of the guaranteed document (S307). The integration server 102 removes the document from the outbound document store 302.

If it is desirable to keep published documents from being placed in the outbound document store 302 when the broker 106 is unavailable, the integration server 102 can be configured to throw an exception instead. After the connection to the broker 106 is re-established, the integration server 102 may send all newly published documents (e.g., guaranteed and volatile) to the outbound document store 302 until the outbound store 302 has been emptied. This allows the integration server 102 to maintain publication order. After the integration server 102 empties the outbound document store 302, the integration server 102 may resume publishing documents directly to the broker 106.

If the integration server 102 makes a predetermined number of attempts (e.g., 3, 4, 5, etc.) to transmit a document from the outbound document store 302 to the broker 106 and all attempts fail, an audit subsystem may log the document and assign it a status of "TOO MANY TRIES." If a transient error occurs while the integration server 102 publishes a document, the audit subsystem may log the document and assign it a status of "FAILED." It is possible to configure publishable document types and the integration server 102 so that the integration server 102 does not validate documents when they are published. A monitor may be used to find and resubmit documents with a status of "TOO MANY TRIES" or "FAILED."

Figure 4:
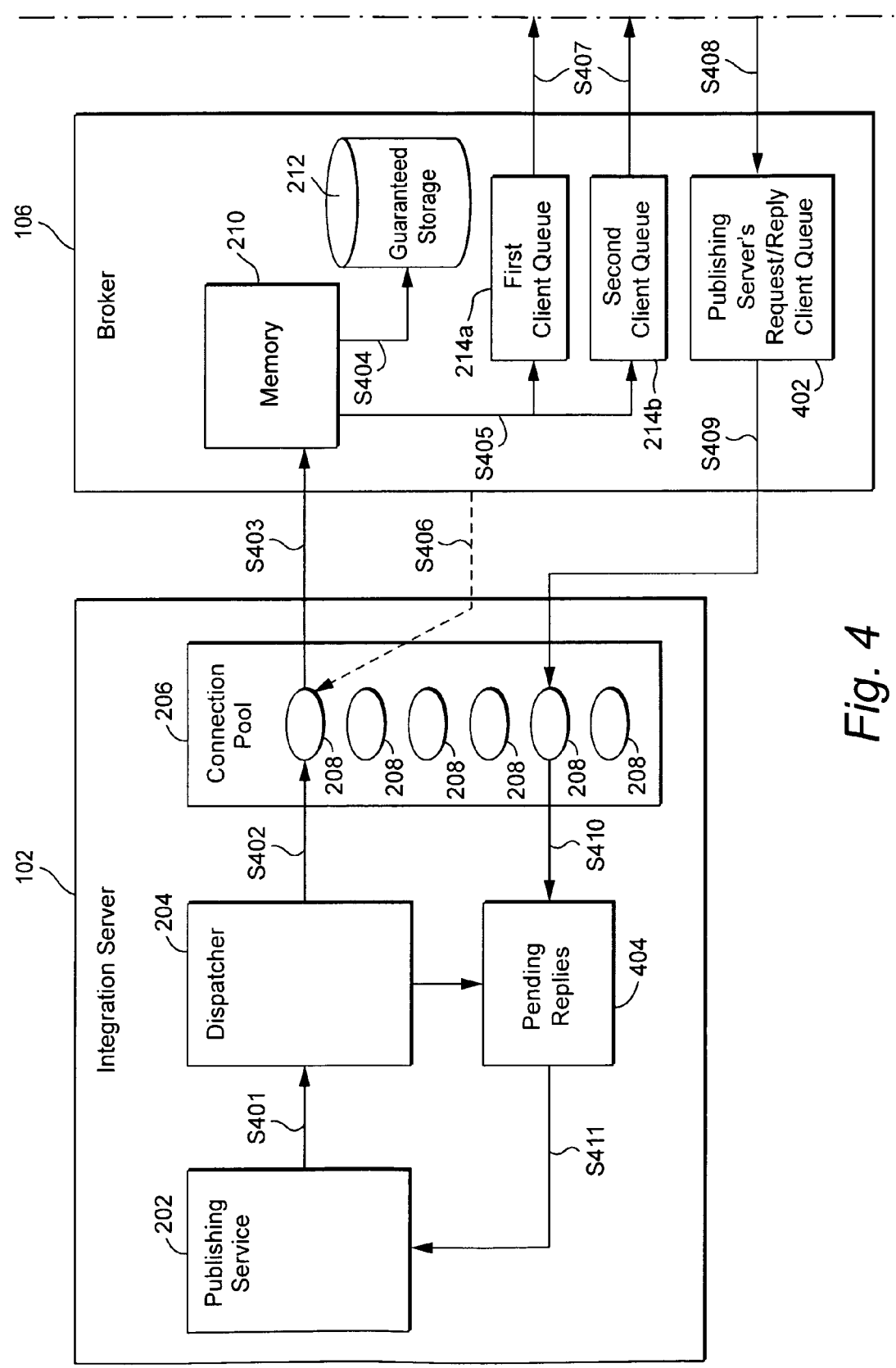
FIG. 4 is a block diagram that illustrates an integration server publishing a document to the broker and waiting for a reply when the request/reply is synchronous.

FIG. 4 is a block diagram that illustrates an integration server publishing a document to the broker and waiting for a reply when the request/reply is synchronous. In a publish-and-wait scenario, a service publishes a document (e.g., a request) and then waits for a reply document. This is sometimes called the request/reply model. A request/reply can be synchronous or asynchronous. In a synchronous request/reply, the publishing flow service stops executing while it waits for a response. When the service receives a reply document from the specified client, the service resumes execution. In an asynchronous request/reply, the publishing flow service continues executing after publishing the request document. That is, the publishing service does not wait for a reply before executing the next step in the flow service. The publishing flow service invokes a separate service to retrieve the reply document.

A publishing service 202 sends a document (e.g., the request) to the dispatcher 204 (S401). The integration server 102 populates a tag field in the document envelope with a unique identifier that will be used to match up the reply document with this request. The publishing service 202 enters into a waiting state. The service 202 will not resume execution until it receives a reply from a subscriber or the wait time elapses. The integration server 102 may begin tracking the wait time as soon as it publishes the document. Before the integration server 102 sends the document to the dispatcher 204, it may validate the document against its publishable document type. If the document is not valid, the service 202 may return an exception specifying the validation error. The service 202 may then unblock, but with an exception.

The dispatcher 204 obtains a connection from the connection pool 206 (S402). The connection pool 206 is a reserved set of connections 208 that the integration server 102 uses to publish documents to the broker 106. To publish a request document to the broker 106, the integration server 102 uses a connection 208 for the request/reply client. If the broker 106 is not available, the dispatcher 204 may route the document to the outbound document store 302, e.g., as described above. The dispatcher 204 sends the document to the broker 106 (S403).

The broker 106 examines the storage type for the document to determine how to store the document (S404). For example, if the document is volatile, the broker 106 stores the document in memory 210. If the document is guaranteed, the broker 106 stores the document in memory 210 and on disk 212. The broker 106 routes the document to subscribers (S405). If the document was published (e.g., broadcast), the broker 106 identifies subscribers and places a copy of the document in the client queue for each subscriber (e.g., both first and second client queues 214a-b). If the document was delivered, the broker 106 places the document in the queue for the client specified in the delivery request (e.g., either first and second client queues 214a-b). If there are no subscribers for the document, the broker 106 returns an acknowledgement to the publisher 202 and then discards the document. If, however, a deadletter subscription exists for the document, the broker 106 deposits the document in the queue containing the deadletter subscription (e.g., either or both of first and second client queues 214a-b). A document remains in the queue (e.g., either or both of first and second client queues 214a-b) on the broker 106 until it is picked up by the subscribing client. If the time-to-live for the document elapses, the broker 106 discards the document. The time-to-live period may be predetermined, e.g., by the user. If the document is guaranteed, the broker 106 returns an acknowledgement to the dispatcher 204 to indicate successful receipt and storage of the document (S406). The dispatcher 204 returns the connection 208 to the connection pool 206.

Subscribers retrieve and process the document (S407). A subscriber uses a service (not shown) to compose and publish a reply document. This service automatically populates the tag field of the reply document envelope with the same value used in the tag field of the request document envelope. This service also automatically specifies the requesting client as the recipient of the reply document. One or more subscribers send reply documents to the broker 106 (S408). The broker 106 stores the reply documents, e.g., in memory 210. The broker 106 places the reply documents in the request/reply client queue 402 for the integration server 102 that initiated the request.

The integration server 102 that initiated the request obtains a request/reply client from the connection pool 206 and retrieves the reply documents from the broker 106 (S409). The integration server 102 uses the tag value of the reply document to match up the reply with the original request (S410). The integration server 102 places the reply document in the pipeline of the waiting service 404 (S411). The waiting service resumes execution.

If the requesting service specified a publishable document type for the reply document, the reply document may be required to conform to the specified type. Otherwise, the reply document may be an instance of any publishable document type. It will be appreciated that a single request may receive many replies. The integration server 102 that initiated the request may use only the first reply document it retrieves from the broker 106. The integration server 106 may also discard all other replies. "First" may be arbitrarily defined. There may be no guarantee provided for the order in which the broker 106 processes incoming replies.

All reply documents may be treated as volatile documents. Volatile documents may be stored in memory 210 and may be lost if the resource on which the reply document is located shuts down or if a connection 208 is lost while the reply document is in transit.

If the wait time elapses before the service receives a reply, the integration server 102 may end the request, and the service may return a null document that indicates that the request timed out. The integration server 102 may execute the next step in the flow service. If a reply document arrives after the flow service resumes execution, the integration server 102 may reject the document and create a journal log message stating that the document was rejected because there is no thread waiting for the document. The publishable document types and the integration server 102 may be configured so that the integration server 102 does not validate documents when they are published.

When an integration server is connected to a broker, the path a document follows on the subscriber side includes, for example, retrieving the document from the broker, storing the document on the integration server, and processing the document. The subscription path for a document may depend on whether the document was published to all subscribers (e.g., broadcast) or delivered to an integration server directly.

Figure 5:
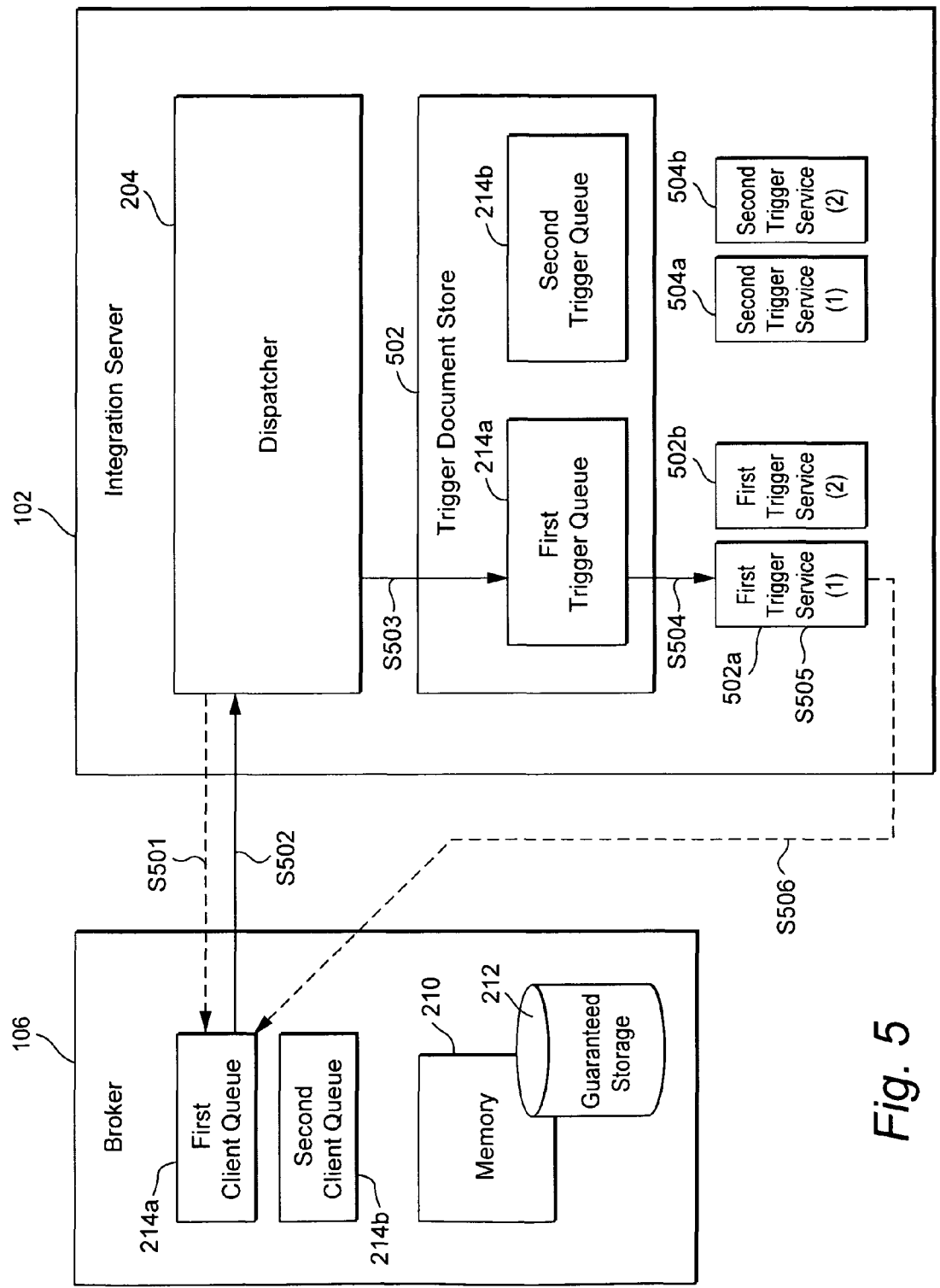
FIG. 5 is a block diagram that illustrates an integration server subscribing to a path for published documents.

FIG. 5 is a block diagram that illustrates an integration server subscribing to a path for published documents. When a document is published or broadcast, the broker places a copy of the document in the client queue for each subscribing trigger. Each subscribing trigger will retrieve and process the document.

The dispatcher 204 on the integration server 102 uses a server thread to request documents from a trigger's client queue 214a on the broker 106 (S501). It will be appreciated that each trigger on the integration server 102 may have a corresponding client queue on the broker 106. The thread retrieves a batch of documents for the trigger (S502). The dispatcher 204 places the documents in the trigger's queue 214a in the trigger document store 502 (S503). The trigger document store 502 may be saved in memory 210, for example. The dispatcher 204 then releases the server thread used to retrieve the documents.

The dispatcher 204 obtains a thread from the server thread pool (not shown), pulls a document from the trigger queue 214a, and evaluates the document against the conditions in the trigger (S504). If exactly-once processing is configured for the trigger, the integration server 102 may first determine whether the document is a duplicate of one that has already been processed by the trigger. In such a case, the integration server 102 may continue processing the document only if the document is new.

If the document matches a trigger condition, the dispatcher 204 executes the trigger service (S502a) associated with that condition (S504). If the document does not match a trigger condition, the integration server 102 may discard the document, return an acknowledgement to the broker 106, and return the server thread to the server thread pool. The integration server 102 also may generate a journal log message stating that the document did not match a condition.

The trigger service executes to completion (e.g., to success or error) (S506). If the trigger service 502a executed successfully, the integration server 102 returns an acknowledgement to the broker 106 (e.g., if this is a guaranteed document). The integration server 102 then removes the copy of the document from the trigger queue 214a and returns the server thread to the thread pool. If a service exception occurs, the trigger service 502a ends in error and the integration server 102 rejects the document. If the document is guaranteed, the integration server 102 returns an acknowledgement to the broker 106. The integration server 102 removes the copy of the document from the trigger queue 214a, returns the server thread to the thread pool, and sends an error document to indicate that an error has occurred. If a transient error occurs during trigger service execution and the service catches the error, wraps it and re-throws it as an exception, then the integration server 102 waits for the length of the retry interval (which may be predetermined and/or user-specified) and re-executes the service using the original document as input. If the integration server 102 reaches the maximum number of retries (which also may be predetermined and/or user-specified) and the trigger service 502a still fails because of a transient error, the integration server 102 treats the last failure as a service error.

After receiving an acknowledgement, the broker 106 may remove its copy of the document from guaranteed storage 212. The integration server 102 may return an acknowledgement for guaranteed documents only. If the integration server 102 shuts down or reconnects to the broker 106 before acknowledging a guaranteed document, the integration server 102 may recover the document from the broker 106 when the server restarts or the connection is re-established. Thus, the documents may be redelivered. If a trigger service generates audit data on an error and includes a copy of the input pipeline in the audit log, a monitor may be used to re-invoke the trigger service at a later time.

It is possible that a document could satisfy more than one condition in a trigger. However, the integration server 102 may execute only the service associated with the first satisfied condition. The processing mode for a trigger determines whether the integration server 102 processes documents in a trigger queue serially or concurrently. In serial processing, the integration server 102 processes the documents one at a time in the order in which the documents were placed in the trigger queue. In concurrent processing, the integration server 102 processes as many documents as it can at one time, but not necessarily in the same order in which the documents were placed in the queue. It will be appreciated that in concurrent processing, the integration server 102 may process a number of documents in dependence on the maximum availability of threads, which may be configured by a user in certain example embodiments.

If a transient error occurs during document retrieval or storage, the audit subsystem may log the document and assign it a status of "FAILED." A transient error is an error that arises from a condition that might be resolved later, such as, for example, the unavailability of a resource related to network issues or failure to connect to a database. A monitor may be used to find and resubmit documents with a status of "FAILED." Also, a trigger may be configured to suspend and retry at a later time if retry failure occurs. Retry failure occurs when the integration server 102 makes the maximum number of retry attempts and the trigger service still fails because of an exception.

Figure 6:
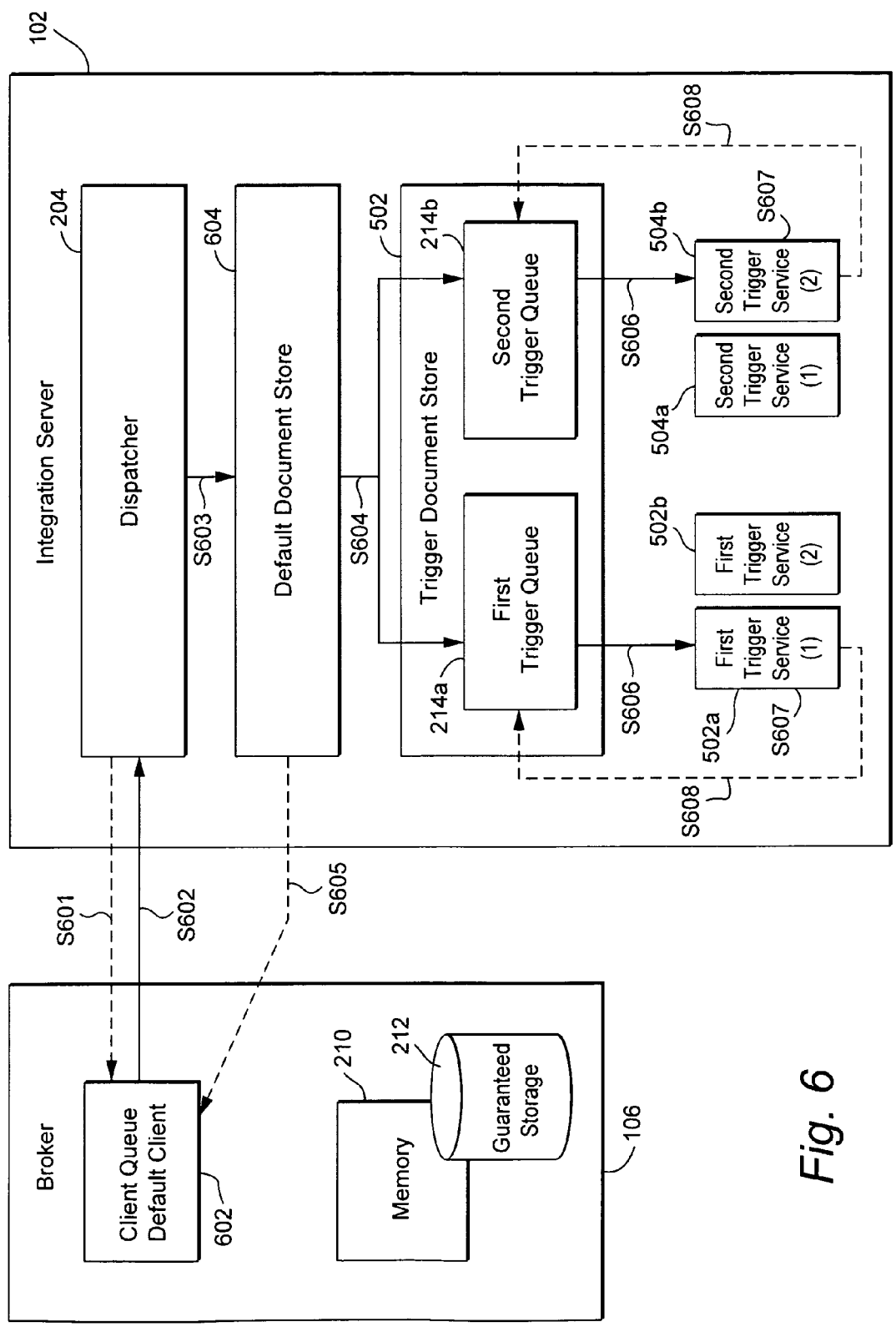
FIG. 6 is a block diagram that illustrates an integration server subscribing to a path for documents delivered to the default client.

FIG. 6 is a block diagram that illustrates an integration server subscribing to a path for documents delivered to the default client. A publishing service can deliver a document by specifying the destination of the document. For example, the publishing service may specify the broker client that is to receive the document. When the broker receives a delivered document, it places a copy of the document in the queue for the specified client only. Typically, documents are delivered to the default client. The default client is the broker client created for the integration server when the integration server first configures its connection to the broker. It will be appreciated that if a publishing service specifies an individual trigger as the destination of the document (e.g., the publishing service specifies a trigger client ID as the destination ID), the subscribe path the document follows is the same as the path followed by a published document.

The dispatcher 204 provided to the integration server 102 requests documents from the default client's queue on the broker 106 (S601). It will be appreciated that the default client may be the broker client created for the integration server 102. The broker 106 places documents in the default client's broker queue 602 only if the publisher delivered the document to the integration server's client ID. The thread retrieves documents delivered to the default client in batches (S602). The number of documents the thread retrieves at one time is determined by, for example, the capacity and refill level of the default document store and the number of documents available for the default client on the broker 106.

The dispatcher 204 places a copy of the documents (e.g., in memory) in the default document store 604 (S603). The dispatcher 204 identifies subscribers to the document and routes a copy of the document to each subscriber's trigger queue 214a-b (S604). In the case of delivered documents, the integration server 102 saves the documents to a trigger queue 214. The trigger queues 214 are located within a trigger document store 502, which may be saved on disk. The integration server 102 removes the copy of the document from the default document store 604 and, if the document is guaranteed, returns an acknowledgement to the broker 106 (S605). The broker 106 removes the document from the default client's queue 602.

The dispatcher 204 obtains a thread from the server thread pool, pulls the document from the trigger queue 214a-b, and evaluates the document against the conditions in the trigger (S606). If exactly-once processing is configured for the trigger, the integration server 102 first determines whether the document is a duplicate of one already processed by the trigger. The integration server 102 continues processing the document only if the document is new.

If the document matches a trigger condition, the integration server 102 executes the trigger services 502a, 504b associated with that condition (S607). If the document does not match a trigger condition, the integration server 102 sends an acknowledgement to the trigger queue 214a-b, discards the document (e.g., removes it from the trigger queue 214a-b), and returns the server thread to the server thread pool. The integration server 102 also generates a journal log message stating that the document did not match a condition.

The trigger service executes (e.g., to success or error) (S608). If the trigger services 502a, 504b executed successfully, the integration server 102 returns an acknowledgement to the trigger queue 214a-b (e.g., if this is a guaranteed document), removes the document from the trigger queue 214a-b, and returns the server thread to the thread pool. If a service exception occurs, the trigger service 502a, 504b ends in error and the integration server 102 rejects the document, removes the document from the trigger queue 214a-b, returns the server thread to the thread pool, and sends an error document to indicate that an error has occurred. If the document is guaranteed, the integration server 102 may return an acknowledgement to the trigger queue 214a-b. The trigger queue 214a-b removes its copy of the guaranteed document from storage. If a transient error occurs during trigger service execution and the service catches the error, wraps it and re-throws it as an exception, then the integration server 102 waits for the length of the retry interval and re-executes the service using the original document as input. If the integration server 102 reaches the maximum number of retries and the trigger service still fails because of a transient error, the integration server 102 treats the last failure as a service error.

The integration server 102 may save delivered documents in a trigger document store 502, which may be located on disk. The integration server 102 may save published documents in a trigger document store located 502, which may be in memory. If the integration server 102 shuts down before processing a guaranteed document saved in a trigger document store on disk, the integration server may recover the document from the trigger document store 502 when it restarts. Volatile documents may be saved in memory and thus may not be recovered upon restart.

If a service generates audit data on error and includes a copy of the input pipeline in the audit log, a monitor may be used to re-invoke the trigger service at a later time. As above, it is possible that a document could match more than one condition in a trigger. However, the integration server 102 executes only the service associated with the first matched condition.

The processing mode for a trigger may determine whether the integration server 102 processes documents in a trigger queue serially or concurrently. In serial processing, the integration server 102 processes the documents one at a time in the order in which the documents were placed in the trigger queue. In concurrent processing, the integration server 102 processes as many documents as it can at one time, but not necessarily in the same order in which the documents were placed in the queue.

If a transient error occurs during document retrieval or storage, the audit subsystem logs the document and assigns it a status of "FAILED." A monitor may be used to find and resubmit documents with a "FAILED" status. A trigger may be configured to suspend and retry at a later time if retry failure occurs. Retry failure occurs when the integration server makes the maximum number of retry attempts and the trigger service still fails because of an exception.

Figure 7:
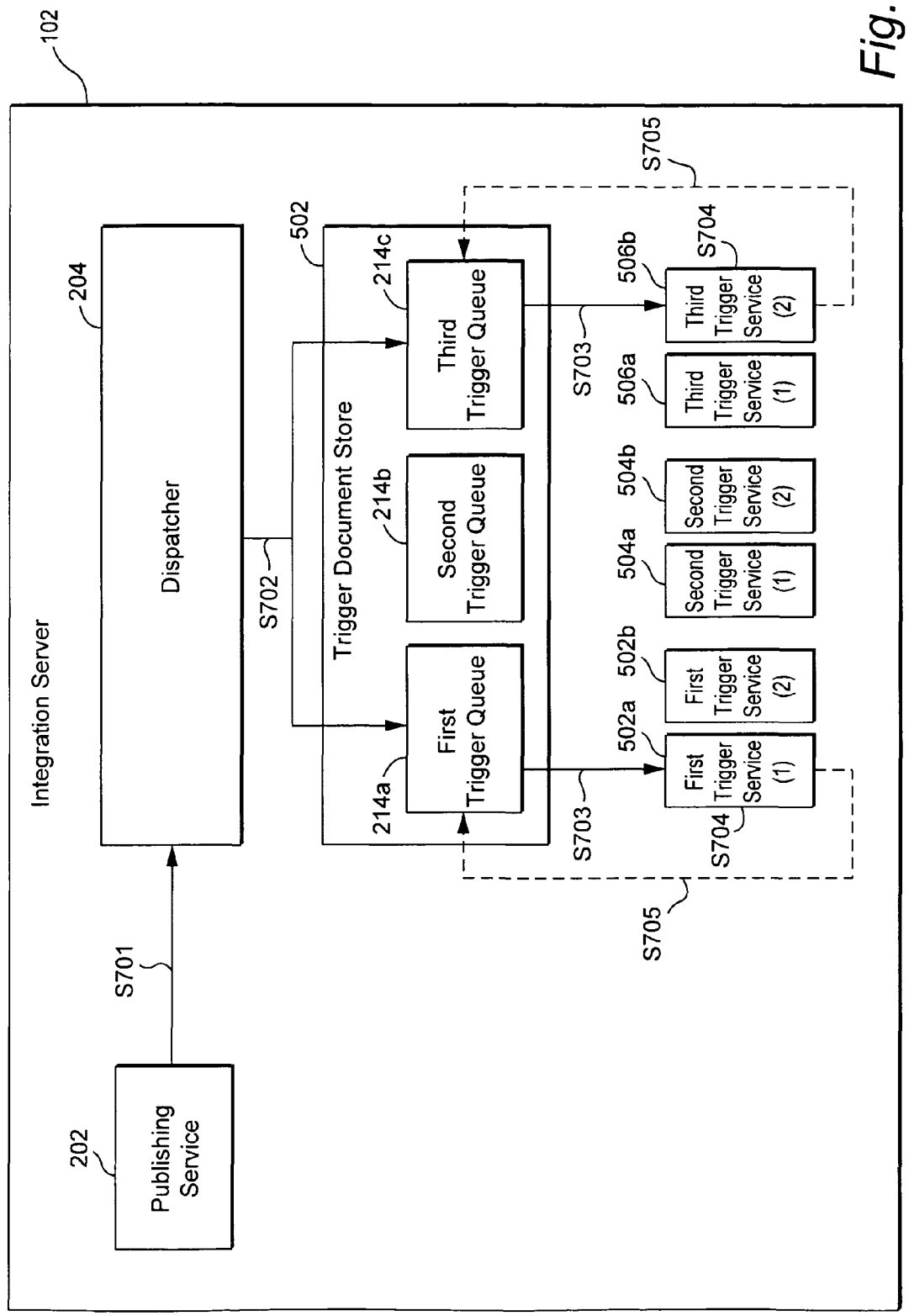
FIG. 7 is a block diagram that illustrates the publish and subscribe paths for a locally published document.

FIG. 7 is a block diagram that illustrates the publish and subscribe paths for a locally published document. Local publishing refers to the process of publishing a document within the integration server. In such a case, only subscribers located on the same integration server can receive and process the document. In local publishing, the document remains within the integration server. There is no broker involvement. Local publishing occurs when the service that publishes the document specifies that the document should be published locally or when the integration server is not configured to connect to a broker.

A publishing service 202 provided to the integration server 102 sends a document to the dispatcher 204 (S701). Before the integration server 102 sends the document to the dispatcher 204, it validates the document against its publishable document type. If the document is not valid, the service returns an exception specifying the validation error. The dispatcher 204 either determines which triggers subscribe to the document and place a copy of the document in each subscriber's trigger queue 214, saving locally published documents in a trigger document store 502 (e.g., located on disk) or, if there are no subscribers for the document, discards the document (S702).

The dispatcher 204 obtains a thread from the server thread pool, pulls the document from the trigger queue 214, and evaluates the document against the conditions in the trigger (S703). If exactly-once processing is configured for the trigger, the integration server 102 first determines whether the document is a duplicate of one already processed by the trigger. The integration server 102 continues processing the document only if the document is new. If the document matches a trigger condition, the dispatcher 204 executes the trigger service 502/504/506 associated with that condition (S704). If the document does not match a trigger condition, the integration server 102 sends an acknowledgement to the trigger queue 214, discards the document (e.g., removes it from the trigger queue 214), and returns the server thread to the server thread pool.

The trigger service executes to completion (e.g., to success or error) (S705). If the trigger service 502/504/506 executed successfully, the integration server 102 sends an acknowledgement to the trigger queue 214 (e.g., if this is a guaranteed document), removes the document from the trigger queue 214, and returns the server thread to the thread pool. If a service exception occurs, the trigger service 502/504/506 ends in error and the integration server 102 rejects the document, removes the document from the trigger queue 214, and returns the server thread to the thread pool. If the document is guaranteed, the integration server 102 sends an acknowledgement to the trigger queue 214. If a transient error occurs during trigger service execution and the service catches the error, wraps it and re-throws it as an exception, then the integration server 102 waits for the length of the retry interval and re-executes the service using the original document as input. If the integration server 102 reaches the maximum number of retries and the trigger service 502/504/506 still fails because of a transient error, the integration server 102 treats the last failure as a service error.

It is possible to configure publishable document types and the integration server 102 so that the integration server 102 does not validate documents when they are published. The integration server 102 may save locally published documents in a trigger document store 502, which may be located on disk. If the integration server 102 shuts down before processing a locally published guaranteed document, the integration server may recover the document from the trigger document store 502 when it restarts. The integration server may not recover volatile documents when it restarts. If a service generates audit data on error and includes a copy of the input pipeline in the audit log, a monitor may be used to re-invoke the trigger service at a later time.

It is possible that a document could match more than one condition in a trigger. However, the integration server 102 may execute only the service associated with the first matched condition. The processing mode for a trigger determines whether the integration server 102 processes documents in a trigger queue serially or concurrently. In serial processing, integration server 102 processes the documents one at a time in the order in which the documents were placed in the trigger queue. In concurrent processing, the integration server 102 processes as many documents as it can at one time, but not necessarily in the same order in which the documents were placed in the queue. It also is possible to configure a trigger to suspend and retry at a later time if retry failure occurs. Retry failure occurs when the integration server 102 makes the maximum number of retry attempts and the trigger service still fails because of an exception.

An overview of the steps for building a publish-and-subscribe solution is now provided. In brief, on the publishing side, a user creates publishable document types for the documents that are to be published and services to process the incoming documents that are published by the publishing side. On the subscribing side, the user creates services that publish the documents and triggers that associate the incoming documents with services that processes the documents.

In greater detail, a first step to building an integration solution involves defining the problem and determining how to solve the problem using the publish-and-subscribe model. When designing the solution, it may be helpful to determine the documents that will need to be published/subscribed to. This information is helpful when creating the publishable document types. Similarly, it also may be helpful to determine how the documents ought to be published. This information is helpful when creating the services that publish the documents. Finally, it may be helpful to determine how to process the documents. This information is helpful when creating the services that process the documents.

In a second step, the production configuration is determined. In some cases, it may be desirable for the development environment to mirror the production environment. Issues to consider include whether all the document publishing and subscribing will be performed on a single integration server or whether multiple integration servers will be used; if multiple integration servers are used, whether a cluster will be configured; and whether a broker will be used in the production environment. In a third step, the publishable document type(s) is/are created. That is, after the documents that will be published is determined, on the publishing side, the publishable document types are created.

In a fourth step, the publishable document types are made available. To create services that process documents and triggers that subscribe to documents, the subscribing side generally needs the publishable document types that define the documents that will be published. When the development environment is a single integration server, the publishing side and the subscribing side are developed on the single integration server. Thus, in general, no actions are needed to make the publishable document types available to other developers. After the publishable document type for the publishing side is created, the publishable document type is immediately available for the subscribing side to use. However, when the development environment includes multiple integration servers with a broker, the publishing side and subscribing side each are developed on separate integration servers connected by a broker. Thus, when the publishable document type is created, a corresponding broker document type is automatically created on the broker. Publishable document types may be made available to other developers. This may be made possible by creating a publishable document type from the broker document type. It also may be made possible by using package replication to distribute publishable document types to developers working with other integration servers. In this case, when other developers receive the package, they may install the package and then synchronize the document types by pulling them from the broker.

In a fifth step, on the publishing side, the services that will publish the documents to the broker or locally on the same integration server are created. In a sixth step, on the subscribing side, the services that will process the incoming documents are created. When creating a service to process a document, a document reference may be included in the input signature to the publishable document type for the published document. In this way, it is possible to reference the data in the document using the fields defined in the publishable document type.

In a seventh step, the triggers are defined. On the subscribing side, triggers are created to associate one or more publishable document types with the service that processes the published documents. To associate a publishable document type with the service, a condition in the trigger can be created that identifies the publishable document type being subscribing to and the service to invoke when a document of that type arrives. It is possible to further refine the condition by adding filters that specify criteria for the contents of a published document. When the trigger is saved, the integration server uses the conditions in the trigger to define subscriptions to publishable document types. Further details on trigger design and configuration are provided below.

Figure 8:
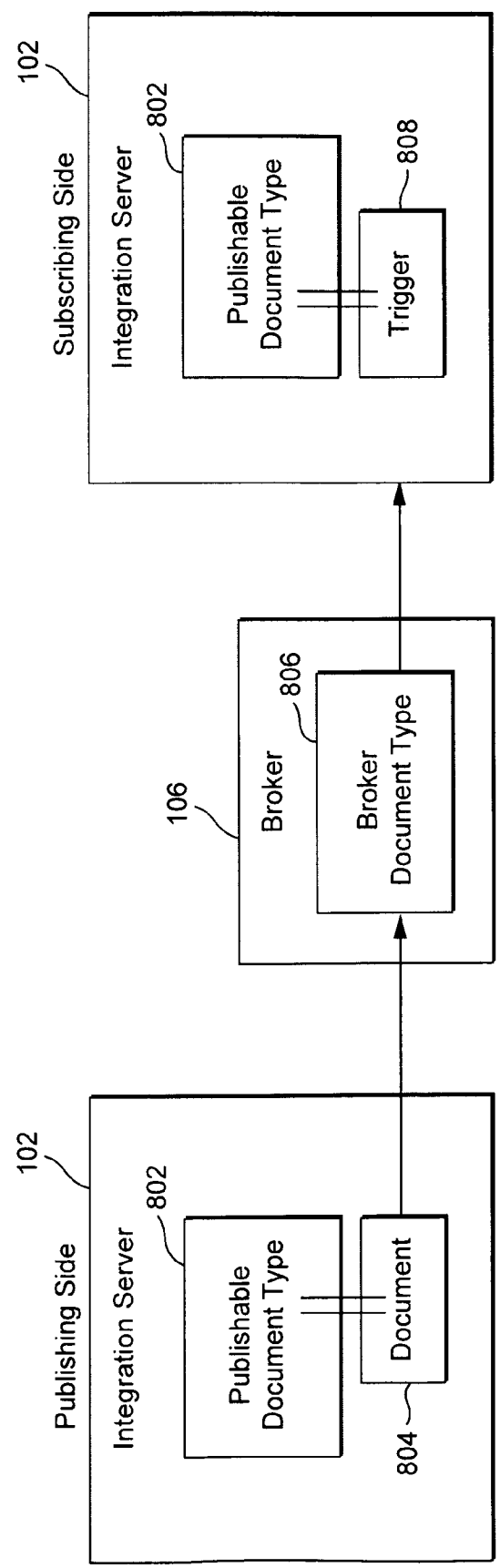
FIG. 8 shows the two sides of a publish-and-subscribe model integration solution, with publishable document types being associated with the same broker document type.

In an eighth step, the publishable document types are synchronized. When a broker is included in the integration solution, each publishable document type has a corresponding broker document type on the broker. FIG. 8 shows the two sides of a publish-and-subscribe model integration solution, with publishable document types being associated with the same broker document type. In a publish-and-subscribe integration solution, both the publishing side and the subscribing side use the same publishable document type 802. The publishing side uses the publishable document type 802 when publishing the document 804 to the broker 106 to identify the type of document being published. The subscribing side references the publishable document type 802 in the trigger 808 to indicate the type of document being subscribed to. For the integration solution to work correctly, the publishable document type 802 on the publishing side and the subscribing side should reference the same broker document type 806.

The following describes how to make a publishable document type correspond to the same broker document type based on the development environment. Where the development environment involves one integration server, when the integration solution is moved into production, the publishing side and subscribing side may be on different integration servers that are connected by a broker. Thus, it may be necessary to synchronize to create the broker document types associated with the publishable document types. Accordingly, on the publishing side, during synchronization, the publishable document types are pushed to the broker to create the broker document type on the broker. Package replication may be used to create and distribute packages containing the publishable document types. On the subscribing side, the package containing publishable document types created by the publisher is installed. During synchronization, document types are pulled from the broker to update the publishable document types.

Where the development environment involves multiple integration servers with a broker, because the broker was used during development, the publishable document types on both the publishing side and subscribing side may already correspond to the same broker document types. Nevertheless, a simple synchronization of all document types may be used to ensure that the publishable document types are synchronized with broker document types.

Further details regarding triggers will now be provided. Triggers establish subscriptions to publishable document types and specify how to process instances of those publishable document types. When a trigger is built, one or more conditions are created. A condition associates one or more publishable document types with a single service. The publishable document type acts as the subscription piece of the trigger. The service is the processing piece. When the trigger receives documents to which it subscribes, the integration server processes the document by invoking the service specified in the condition.

Building a trigger is a process that involves the following basic stages. A new trigger on the integration server is created. During this stage, the new trigger is created on the integration server where development and testing will be performed. One or more conditions for the trigger are created. During this stage, publishable document types are associated with services, filters to be applied to incoming documents are created, and join types are selected. Trigger properties are set. During this stage, parameters that configure the run-time environment of this trigger are set, such as, for example, trigger queue capacity, document processing mode, trigger service retry limit, and exactly-once processing. Testing and debugging may be performed on the trigger.

The service that processes a document received by a trigger is called a trigger service. A condition generally specifies a single trigger service. Before a trigger can be enabled, the trigger service must already exist on the same integration server. Additionally, the input signature for the trigger service needs to have a document reference to the publishable document type. The name for this document reference is the fully qualified name of the publishable document type. The fully qualified name of a publishable document type may conform to a set format, such as, for example: folder.subfolder:PublishableDocumentTypeName.

When a trigger is saved, the integration server may evaluate the trigger and specifically, the conditions in the trigger, to make sure that the trigger is valid. If the integration server determines that the trigger or a condition in the trigger is not valid, an error message may be displayed to the user and the trigger may be disabled. In certain implementations, a trigger may be considered valid when each of the following is true: the trigger contains at least one condition; each condition in the trigger specifies a unique name; each condition in the trigger specifies a service; each condition in the trigger specifies one or more publishable document types; if multiple conditions in the trigger specify the same publishable document type, the filter applied to the publishable document type is the same in each condition; the syntax of a filter applied to a publishable document type is correct; and the trigger contains no more than one join condition.

In general, a trigger can subscribe to publishable document types only. Multiple triggers (and multiple conditions within a trigger) can reference the same publishable document type. At run time, for each trigger, the integration server invokes the service specified for the first condition that matches the publishable document type criteria.

Figure 9:
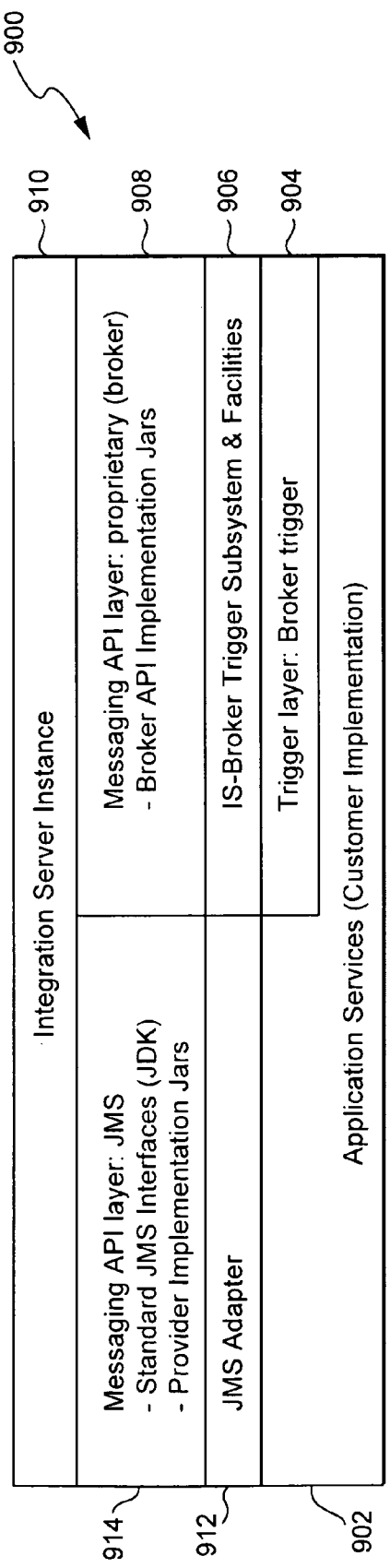
FIG. 9 is an illustrative block diagram representing the current messaging protocol.

FIG. 9 is an example block diagram representing the current messaging layer 900 that provides communications among, between, and with components the above-described system. Certain aspects of the messaging layer 900 may sit on both the integration server (or an instance of the integration server) and the broker as separate implementations, and/or it could be present on any provider, in certain example embodiments. In the messaging layer 900, application services 902 are provided as customer implementations. A messaging provider (e.g., a broker functioning in a proprietary or a JMS mode, another JMS provider) optionally may be distinguished from the clients that access the provider. In such cases, the clients can be an integration server or a custom program or application, e.g., that embeds the providers' client libraries. Such client libraries may include the JAR files included in the messaging API layer (e.g., the broker API and/or the JMS API). In certain example embodiments, high layers of the messaging layer (e.g., the JMS adapter and the trigger layers, through the application code) may reside on the integration server.

The trigger layer 904 enables the above-described broker trigger services, which interact with the integration server broker trigger subsystem and facilities 906 as described above. These layers enable access to the proprietary (e.g., broker) messaging API layer 908. The broker API may be distributed and/or implemented via JAR files. Thus, the right side of the messaging layer 900 provides a rich set of features that may interact with an integration server or integration server instance 910 through proprietary messaging layers to provide an application integration solution.

As noted above, to provide interoperability and/or communications over an open, standards-based messaging protocol, appropriate messaging protocols (e.g., JMS messaging) may be enabled through the use of an adapter. Thus, on the left side of the messaging layer 900, a JMS adapter layer 912 is provided to interface with the JMS API layer 914, which may be enabled using the standard JMS interfaces provided by the JDK. Thus, the left side of the messaging layer 900 provides interoperable and/or open messaging features that may interact with an integration server instance 910 through the JMS-related layers to provide an application integration solution.

As will be readily appreciated from FIG. 9, the current messaging layer 900 does not include a trigger subsystem for the left side of the messaging protocol. Thus, applications built on the JMS adapter lack the extended capabilities of the broker trigger subsystem. As such, with the current messaging layer 900, users were forced to choose between interoperability and standards-based messaging and processing on the one hand, and more powerful, proprietary messaging and processing on the other.

The solution to this problem implemented in certain example embodiments involves fully embedding JMS as a peer to the proprietary messaging protocol in the integration server trigger subsystem so that all or substantially all existing capabilities would be JMS-enabled.

Figure 10:
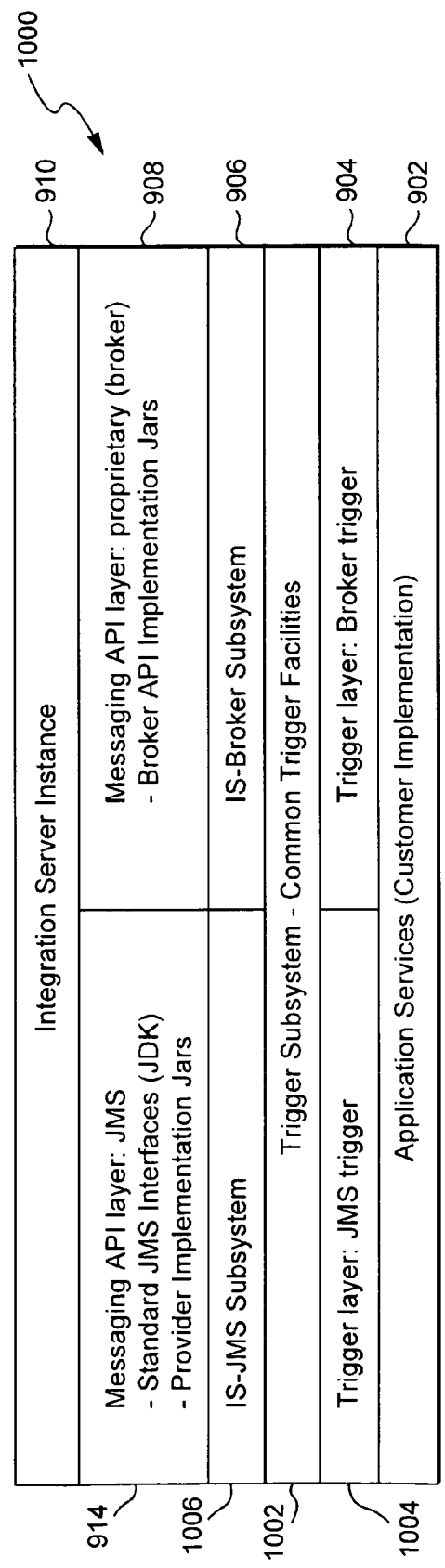
FIG. 10 is an illustrative block diagram representing a messaging layer in accordance with an example embodiment.

Accordingly, FIG. 10 is an illustrative block diagram representing a messaging layer 1000 in accordance with an example embodiment. As in the message layer of FIG. 9, this messaging layer 1000 of certain example embodiments may sit on both the integration server (or an instance of the integration server as shown in FIG. 10) and the broker as separate implementations (which is not the case shown in FIG. 10). It could be present on any provider, such as, for example, one that supports JMS messaging. However, through the use of the messaging layer 1000 of certain example embodiments, JMS messaging may be enabled without the use of a special adapter provided to the integration server. Furthermore, in certain example embodiments, such a messaging layer 1000 may make it possible to avoid making any changes to the JMS trigger itself (e.g., may enable standard JMS messages in a regular format to be used) and/or may reduce the need for custom programming and/or implementation at the application service level in certain example cases.

As will be appreciated from FIG. 10, the left side of the messaging layer 1000 essentially mirrors the right side thereof. In particular, a JMS trigger layer 1004 is provided as a counterpart to the broker trigger layer 904, and a JMS subsystem 1006 (which helps take the place of the JMS adapter 912) is a counterpart to the broker trigger subsystem 906. The same JMS messaging API layer 914 and proprietary broker messaging API layer 908 are still provided. However, there is included in the messaging protocol 1000 a trigger subsystem 1002 which provides common trigger facilities. Trigger subsystem 1002 is provided as a value-added layer above individual trigger subsystems, thereby enabling the parallel subsystems to function.

Certain example embodiments enable the trigger subsystem 1002 by taking one or more of the following specific measures. First, the integration server trigger namespace entity is extended and adapted to include properties and settings specific to JMS messaging. The trigger namespace is a named object that enables configuration regarding how long to wait for messages and how to process such messages when they are received. It may be organized, for example, as a named hierarchy of folders. For example, the following construct represents an instruction as to how a business application should process order documents as they are received: bussapp.processpo:handlineincomingprocessingorder. The namespace may be organized as a tree, and configuration may be performed at the node level.

Second, the integration server trigger administration capabilities are extended and adapted to include options specific to JMS (e.g., an alternate throttling scheme). Such administrative capabilities are useful in regulating the flow of messages into the system (e.g., to reduce the chances of the system becoming overwhelmed). Administration may be performed globally and/or on the trigger level. Example functionality includes regulating/suspending trigger acceptance and/or processing.

Third, the integration server trigger clustering model is extended and adapted for JMS. It will be appreciated that clustering, e.g., as provided behind a load-balancer, may provide for increased scalability and survivability. In certain example embodiments, the same trigger may be used on one or more integration servers.

Fourth, the integration server trigger join mechanism is extended and adapted for JMS. In a join operation, a trigger waits for multiple documents if the process calls for the processing of all documents at once. Fifth, the integration server trigger ordered service execution mechanism is extended and adapted for JMS. The ordered service execution guarantees in-order processing if multiple documents are involved. Sixth, implementation of integrated transaction handling is provided for the trigger subsystem for JMS messages. Transaction handling involves tying a processing sequence to a transaction. The processing sequence may then be committed as a whole transaction, or changes may be rolled back if any operation in the transaction fails.

Also, in certain example embodiments, certain custom extensions are provided for cases where the broker is used as the JMS provider itself. For example, a single-step (e.g., JNDI) configuration, multi-server failover (e.g., shared client mode), and/or streaming large-message processing may be enabled. Indeed, the configuration capabilities provided by certain example embodiments simplify the custom programming and implementation requirements of the current techniques. For example, certain example embodiments provide a menu-based configuration tool as compared to requiring actual programming.

The standard flow for message processing involves pre-processing, processing, and post-processing. Pre-processing involves message retrieval and evaluation, which may include, for example, cluster support, duplicate detection, transaction initiation, and the like. Processing involves service dispatch, which may include, for example, local filter processing, concurrency of application, join and ordered service execution evaluation, and the like. Post-processing involves message acknowledgement, which may include, for example, error and retry handling, transaction completion, and the like.

These configuration techniques provide certain illustrative advantages. For example, because message handling and processing is addressed through triggers, the capabilities built into the integration sever can be leveraged. Because the trigger construct of certain example embodiments is unique, so too is the JMS-based delivery mechanism. Moreover, even though the conventional broker provides the rich feature set through a proprietary protocol with reduced interoperability and JMS messaging provides interoperability with reduced features, certain example embodiments provide both interoperability over standards-based messaging protocol and a powerful feature set. Thus, providing an extension to messaging layer reduces (and sometimes eliminates) the need for custom development of messaging layers, adapters, and/or applications using such custom messaging layers and/or adapters. As such, it is possible to avoid repeated recoding which often is done in a non-standard way, with the same and further functionality instead being provided in a configuration-based manner.

Thus, the general advantages include richly enhanced, fully interoperable standards-based (e.g., JMS-based) message processing, the ability to use alternate (e.g., JMS) messaging providers in addition to or in place of the proprietary broker, and the ability to connect to more than one messaging provider simultaneously (e.g., one broker and/or any number of JMS providers). Specific illustrative advantages provided by the trigger subsystem may include in certain example implementations declarative configuration of listeners for one or more JMS destinations (e.g., queues or topics), configured concurrency for server load control (e.g., threads may be available per-trigger and/or globally), global and per-trigger runtime administration (e.g., monitoring, suspension and resumption, capacity management, etc.), once-and-only-once processing (e.g., guaranteed processing, duplicate detection, error retry, etc.), automated transient error handling and recovery (e.g., for temporarily unavailable backend applications), cluster support for message processing (e.g., providing scalability, availability, and failover features), stream-based messaging for large documents (e.g., to reduce memory overload), conditional message processing based on joins (such as or, and, xor) which are useful in business process model execution, ordered service execution for sequences of ordered messages, integrated local and XA transaction support, client-side queuing for messaging (e.g., to support JMS provider unavailability), local filters (e.g., beyond limited JMS selector capability), etc.

As indicated above, it would be desirable to use the standards-based triggers of certain example embodiments to communicate other message types over the triggers' standards-based transport in yet further example embodiments. This approach potentially enables the benefits of both the standards-based trigger protocol as well as the actual message protocol to be realized. Certain example embodiments implement a standards-based and configuration-driven approach for such techniques. The standards-based and configuration-driven approach to such techniques is implemented in accordance with a binding specification that links or binds the standards-based triggers to the messages' protocol in certain example embodiments. As noted above, one advantageous protocol for the messages is SOAP, and one advantageous protocol for the triggers involves JMS messaging. Thus, certain example embodiments may be implemented using the SOAP over JMS 1.0 specification as the binding specification so as to enable messaging according to SOAP over JMS.

In general, a binding specification will specify the necessary header information for the standards-based message and also will specify how to interpret the documents that provide configuration information for invoking one or more particular services of interest. In certain example embodiments, the binding specification may provide information as to how to interpret JMS-specific bindings within a Web Service Definition Language (WSDL) document. The header information may include JMS trigger header information, as well as information as to how to interpret a Web Service Definition Language (WSDL) document. JMS message header information may include, for example, properties indicating whether the request message is persistent, the lifetime of the request message (e.g., in milliseconds) if one exists, the JMS priority associated with the request message, the name of the destination to which a response message should be sent if one exists, and/or the like.

It will be appreciated that although certain example embodiments are described herein as relating to providing support for processing SOAP messages over the JMS transport, it will be appreciated that other protocols may be used in place of or in addition to these illustrative protocols. For example, certain example embodiments described herein may be implemented in connection with any suitable message protocol being transmitted over the transport of any suitable standards-based trigger protocol. In other words, any first standards-based messaging protocol may be used to create a trigger so that a message envelope according to any second standards-based messaging protocol may be communicated over the first standards-based messaging transport layer.

Certain example embodiments provide a configuration-driven approach to receiving such messages and passing them into the Integration Server's web service stack, while also enabling certain value-added services. The value-added services provided by certain example embodiments may include, for example, Exactly Once Processing and Access Control for Web Services, etc.

To receive SOAP messages over JMS, certain example embodiments implement a new type of JMS trigger, referred to herein as the SOAP-JMS trigger. The SOAP-JMS trigger of certain example embodiments extends the functionality of the JMS triggers described hereinabove. However, as will become clear from the detailed description below, certain example embodiments also have the ability to receive SOAP messages from a JMS provider, extract the SOAP envelope from an incoming message, and pass it to the Integration Server's web service stack. The SOAP-JMS trigger also may be responsible for returning response SOAP messages when performing request-reply operations, as well as fault messages if/when an exception occurs, in certain example embodiments.

In general, certain example embodiments may, at design time, create a Web Service Descriptor (WSD) from a pre-defined Web Service Definition Language (WSDL) document and setup web service (WS) endpoints. Additionally, certain example embodiments in general may, at run time, designate data to be sent, call an appropriate web service connector specifying the data to be sent, create a SOAP message from the data, create any necessary JMS headers, create a JMS message with the appropriate SOAP-JMS headers and the SOAP message as the body of the JMS message, and send the actual runtime message with the associated SOAP message over the JMS subsystem. In the event that an acknowledgement is requested, following the above-listed run time activities, an appropriate acknowledgement SOAP message may be generated, any necessary JMS headers may be generated, a return acknowledgement message with the appropriate SOAP-JMS headers and the SOAP message as the body in JMS trigger may be created, and the acknowledgement message may be returned.

A more detailed description of these example processes and the underlying systems that enable them, will now be provided. Web services are building blocks for creating open, distributed systems. A web service is a collection of functions that are packaged as a single unit and published to a network for use by other software programs. A WSD 1204 typically is created before the web service connector 1202 runs. A WSD is an IS element that defines a web service in IS terms and, in general, a WSD gathers much of the relevant information about web service. In this regard, WSDs may contain the message formats, data types, transport protocols, and transport serialization formats that should be used between the consumer (requester) and the provider of the Web service. WSDs also may specify one or more endpoints (e.g., one or more network locations or JMS destinations at which a web service can be invoked). In essence, the WSD represents an agreement governing the mechanics of interacting with that service. Thus, WSDs are present on both the sending (consumer) and receiving (producer) sides of the model in certain example embodiments.

A provider WSD defines a web service that is hosted on the Integration Server, i.e., a service "provided" to external users. A provider WSD will expose one or more IS services as operations, which can be published to a registry as a single web service. External users can access the web service through the registry and invoke the IS services remotely. A provider WSD may be created from one or more IS services and/or from a WSDL document, and is designed to allow the IS services to be invoked as web services over a network. The provider WSD contains all the data required to create a WSDL document for the IS web service, as well as the data needed at run time to process the request and response. When a provider WSD is created from an existing WSDL document or from a web service acquired from a UDDI registry, the process is commonly referred to as "WSDL First." The provider WSD can be published to a UDDI registry (or other publicly accessible server) as a web service, which can be invoked remotely by an external user. It will be appreciated that a web service provider also may distribute a WSDL document and supporting files to web service consumers directly in certain example embodiments.

A consumer WSD may be created from a web service in a UDDI registry or from a WSDL document and is designed to allow the Integration Server to invoke the web service as part of an IS flow service. It may contain all the data from the WSDL document that defines the web service, as well as data needed for certain Integration Server run-time properties. A consumer WSD thus defines an external web service, allowing the integration server to create a web service connector for each operation in the Web service. When the consumer WSD is created, one or more web service connectors also may be created.

A web service connector is a flow service with an input and output signature that corresponds to the input and output messages of the web service operation(s) contained in the WSDL document from which it was created. As indicated above, the web service connector(s) may be created when a consumer WSD is created, e.g., from a web service. The web service connector may be invoked to run a remote web service operation. Thus, the web service connector 1202 essentially is the "executable" of the integration server 102'.

Together, WSDs and web service connectors may be used to:
  Expose one or more IS services as operations of a Web service.
  Define and configure web services including, for example, settings used to generate a WSDL document for a provider web service descriptor and any information needed to process a SOAP request or response.
  Provide a URL to acquire a WSDL document for an IS provider web service.
  Define one or more "aliases" to be used with dynamic endpoint addressing for both provider and consumer web services. For a provider WSD, the alias may be used to populate the endpoint address of the web service when generating the WSDL. For a consumer WSD, the alias is used at runtime when a web service connector is invoked to determine the actual endpoint address of the web service and/or to supply user credentials to be used with the request.
  Use Document-Literal, RPC-Literal, and RPC-Encoded style SOAP messages.

Use either SOAP 1.1 or SOAP 1.2 protocols in Web service invocations.

Define and process SOAP headers and handle SOAP faults (for both provider and consumer web services).

Secure both provider and consumer web services.

As indicated above, WSDs typically are created from WSDL documents, e.g., through a wizard. The WSDL documents, in turn, provide configuration information for invoking a particular web service of interest. In this regard, a WSDL document is a document (e.g., an XML document) that describes web services that are accessible over a network. The WSDL document for a web service may contain information a web service consumer needs to send data to the web service, invoke the web service, and receive data from the Web service. For example, a WSDL document for a web service may describe:

The logic the web service performs.

The location of the web service.

The method(s) to use to access the web service, e.g., the protocol that the web service consumer should use to invoke the web service and receive a response.

The input parameters that the web service consumer should supply to the web service and the output parameters that the Web service returns.

The following table describes the basic elements in a WSDL document:

| Element | Description |
| --- | --- |
| <definitions> | Contains the elements that describe a web service. |
| <types> | Contains the type definitions that describe the data that is received and sent by the web service. The <types> element can reference entire XML Schemas and can contain simple type definitions, complex type definitions, and element declarations. The type definitions and element declarations help define the input and output parameters for the web service. A WSDL may use an XML schema as its native type system. |
| <message> | Specifies the data that is received and sent by the web service. A <message> element may describe a set of input parameters or a set of output parameters. Each <message> element may contain one or more <part> elements. A <part> element may associate a piece of data with a name and a type definition or element declaration. The type definition or element declaration referenced by the <part> element may be defined, declared, or referenced in the <types> element. |
| <operation> | Specifies the messages that are received and sent by the web service. Within the <operation> element, the <input> element may identify the message whose parts specify the input parameters to the web service while the <output> element may identify the message whose parts specify the output parameters of the web service. Essentially, the operation specifies the signature for the web service. An <operation> element may be declared within a <portType> element. |
| <portType> | Defines a named set of operations. The <portType> element may associate a port type name with a set of operations. A <portType> element may contain multiple operations. |
| <binding> | Specifies the protocol and message format to use to access the operations in a port type. Each <binding> element may specify one protocol for a port type; however, a WSDL document may define more than one binding for a single port type. A WSDL document may include one <binding> element for each protocol that it supports. |
| <port> | Associates a binding with a network address. Together, the binding and network address may specify how to invoke a web service. Each port may specify one network address for a binding; however, multiple ports may be defined for a single web service. Port elements may be defined within the <service> element. |
| <service> | Groups ports that may be used to call web services. A <service> element may contain many ports. |

The <address> element in the <port> element may specify the location of a web service. More specifically, the <address> element may carry a location attribute that specifies the network address for a service, or the URI that specifies the JMS destination. The WSDL generator may create a value for this attribute using the protocol, transport, host, port, and directive information that you provide when the WSDL document is generated.

For WSDL documents that specify SOAP Document-Literal, SOAP RPC-Literal, or SOAP RPC-Encoded as the protocol, the location attribute in the <address> element may be of or include the following example format:

transport://host:port/soap/directive

The location attribute in the <operation> element may specify the fully qualified path name of the service on the Integration Server and may be of or include the following example format:

folder.subfolder/service

The WSDL namespace helps to distinguish WSDL-related elements and attributes from elements and attributes defined in other namespaces. The following namespace prefixes may be found in a WSDL document and may be inserted in WSDL documents upon generation thereof: mime, wsdl, webM, soap, http, xsd, tns, etc.

WS endpoints basically provide additional configuration information and may be thought of as providing global configuration information for the WSDs. For example, the on the provider side, endpoints may store configuration used to generate the web service's endpoint reference (e.g., a JMS URI) and/or the JMS bindings in a WSDL. In this regard, an example JMS provider web service endpoint alias may include some or all of the following and/or other JMS parameters:

| Parameter Name | Description |
| --- | --- |
| SOAP-JMS Trigger Name | Dropdown containing valid SOAP-JMS trigger names. |
| Delivery Mode | Dropdown containing an empty value, "PERSISTENT" and "NONPERSISTENT". Default to empty value. |
| Time to Live | Number (long) representing message's lifetime (in milliseconds). If the time-to-live is specified as zero, expiration is set to zero to indicate that the message does not expire. Default to empty value. |
| Priority | Number (0 thru 9) representing the message's priority, with 0 as the lowest priority and 9 as the highest. Default to empty value. |
| Reply To Name | Name or lookup name of JMS destination where a reply to the message should be sent. |
| Reply To Type | Dropdown containing an empty value, "Queue" and "Topic". Default to empty value. Note: this parameter may only be applicable when performing MEP In-Out. |
| Include Connection Factory Name in JMS URI | Checkbox indicating connection factory name may be included in the generated WSDL. Default to selected (e.g., true). |
| Include JNDI Parameters in JMS URI | Checkbox indicating JNDI parameters may be included in the generated WSDL. Default to not selected (e.g., false). |

A JMS provider web service endpoint alias in certain example embodiments may contain enough information to generate a valid JMS URI. A JMS URI may be used to designate a javax.jms.Destination object and optionally provide additional information concerning the way that the destination object is to be used. The JMS URI may include the scheme name (e.g., "jms"), the variant identifier, the "jms-dest" portions, etc. Three recognized variants are "jndi," "queue," and "topic." The "jms-dest" portion identifies the JMS destination object in a way that is determined by the particular variant. Other parameters, such as JNDI parameters and JMS Message header settings can also be included in the JMS URI. One example format for the JMS URI is:

"jms:" jms-variant ":"jms-dest["?" param*("&" param)]

Information that may be used to build the JMS URI may be retrieved from the SOAP-JMS trigger. The SOAP-JMS trigger may contain the name (or lookup name) of the destination, and it may contains the name of the JMS Connection Alias that it is using to connect to the JMS provider.

If the JMS Connection Alias uses JNDI to connect to the JMS provider, then the variant identifier portion of the JMS URI may be "jndi." If the JMS Connection Alias uses the Native webMethods API to connect to the JMS provider, then the variant identifier portion of the JMS URI may be "queue" or "topic" or the like. The "jms-dest" portion of the JMS URI, as well as the distinction between "queue" and "topic," may be made by the SOAP-JMS trigger parameter's Destination Name and Destination Type.

In accordance with the URI Scheme for Java Message Service 1.0 specification, the JMS URI may also contain parameters used to connect to the JMS provider.

If the JMS Connection Alias uses JNDI to connect to the JMS provider and the Include Connection Factory Name in JMS URI flag is set to true, then the Connection Factory Name may be included in the JMS URI.

If the JMS Connection Alias uses JNDI to connect to the JMS provider and the Include JNDI Parameters in JMS URI flag is set to true then the JNDI parameters may be included in the JMS URI. One possible exception is that JNDI security parameters may not be included in the JMS URI. Security parameters may be set using a WS Endpoint Alias.

If the JMS Connection Alias uses the Native webMethods API to connect to the JMS provider, then the name of the JMS Connection Alias may be included in the JMS URI with the parameter name wm-jmsconnectionalias or the like.

Optionally the other JMS message header properties, such as Delivery Mode, Time To Live, Priority, Reply To Name, etc., may also be included in the JMS URI.

When using a WSD to generate a WSDL that includes a JMS transport, the JMS provider web service endpoint alias configuration may be used to generate the JMS bindings in the WSDL. In this regard, the soapjms namespace may be added to the definitions, the WSDL document's port address may equal the JMS URI string, including connection factory name and JNDI parameters, but not message header parameters. The message header parameters may be included in the binding section, and they may include the soapjms prefix. The binding transport may be the JMS transport namespace.

WS endpoints on the consumer side allow users to specify how and where the Integration Server should send SOAP over JMS messages in certain example embodiments. The JMS consumer web service endpoint alias may include, for example, a JNDI provider alias, a JMS connection alias, and/or the like. The JNDI Provider Alias may specify JNDI settings (such as, for example, Initial Context Factory and URL). The JMS Connection Alias may include JNDI configuration and/or native configuration used to access the JMS provider directly.

It is possible that all information needed to send the SOAP over JMS message will be included in the WSDL document that is provided by the web service provider. In such a case, the JMS consumer web service endpoint alias may not be needed. However, it is also possible that some information may be excluded from the WSDL document. For example, the WSDL document may include the JNDI Connection Factory Name, but not the JNDI parameters. According to the SOAP over JMS 1.0 specification, however, the only required JMS information that needs to be included in the WSDL is the lookup variant and destination name. The endpoints may help resolve this inconsistency in certain example embodiments.

Figure 11:
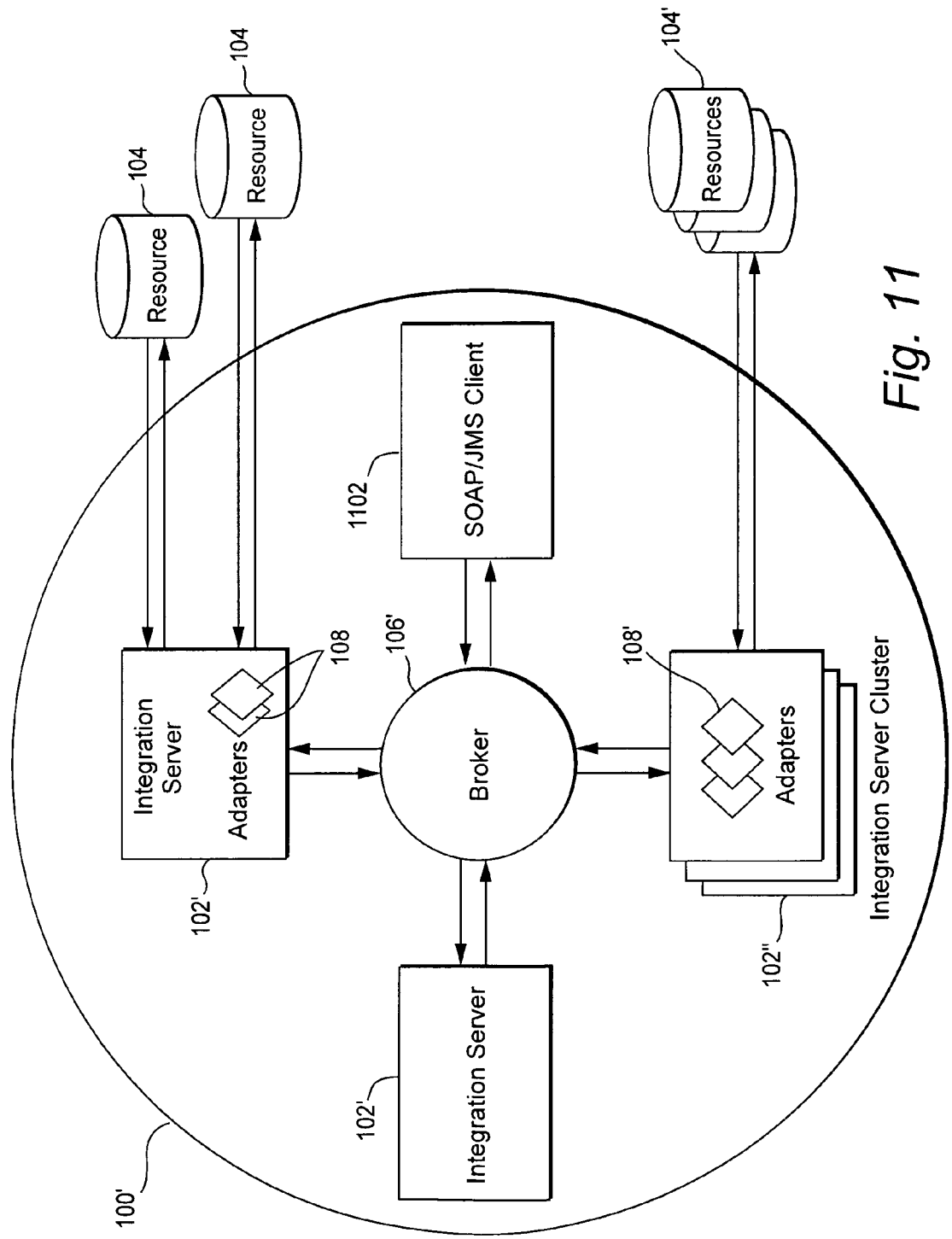
FIG. 11 is a schematic view of an illustrative application integration system that incorporates proprietary and various standards-based triggers in accordance with an example embodiment.

Referring once again to the drawings, FIG. 11 is a schematic view of an illustrative application integration system 100' that incorporates proprietary and various standards-based triggers in accordance with an example embodiment. The application integration system 100' of FIG. 11 is similar to the application integration system 100 of FIG. 1. Indeed, the FIG. 11 application integration system 100' can be implemented in place of, or in addition to, the application integration system 100 of FIG. 1. Briefly, the application integration system 100' of FIG. 11 includes a SOAP/JMS client 1102. The SOAP/JMS client 1102 is coupled to the broker 106', and the SOAP/JMS client 1102 may be a third-party or other client. The broker 106' in certain example embodiments may be a JMS provider (e.g., a JMS 1.1 provider)

Figure 12:
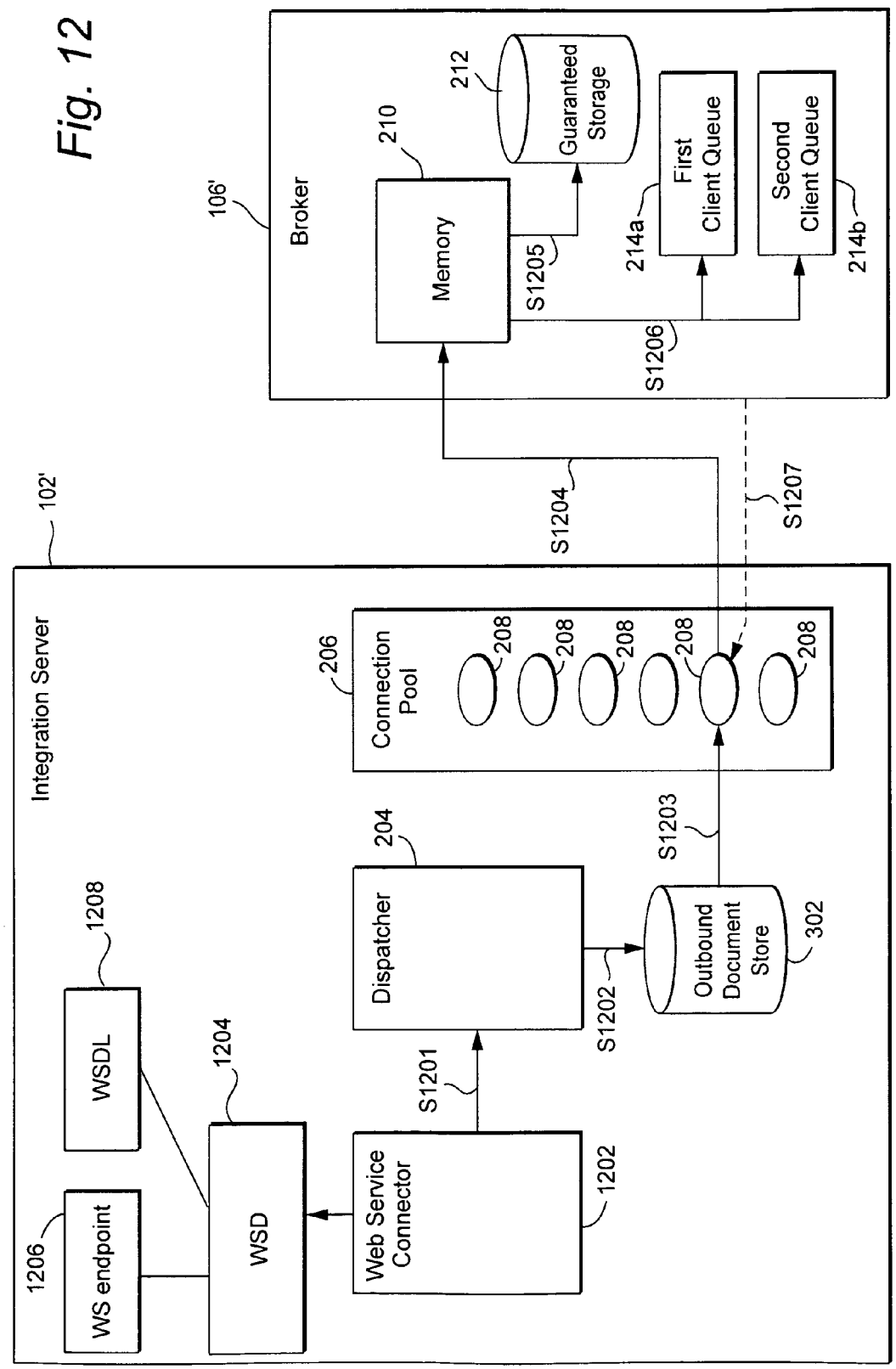
FIG. 12 is a block diagram that illustrates the "in-only" message exchange pattern behavior of a message producer in accordance with an example embodiment.
Figure 13:
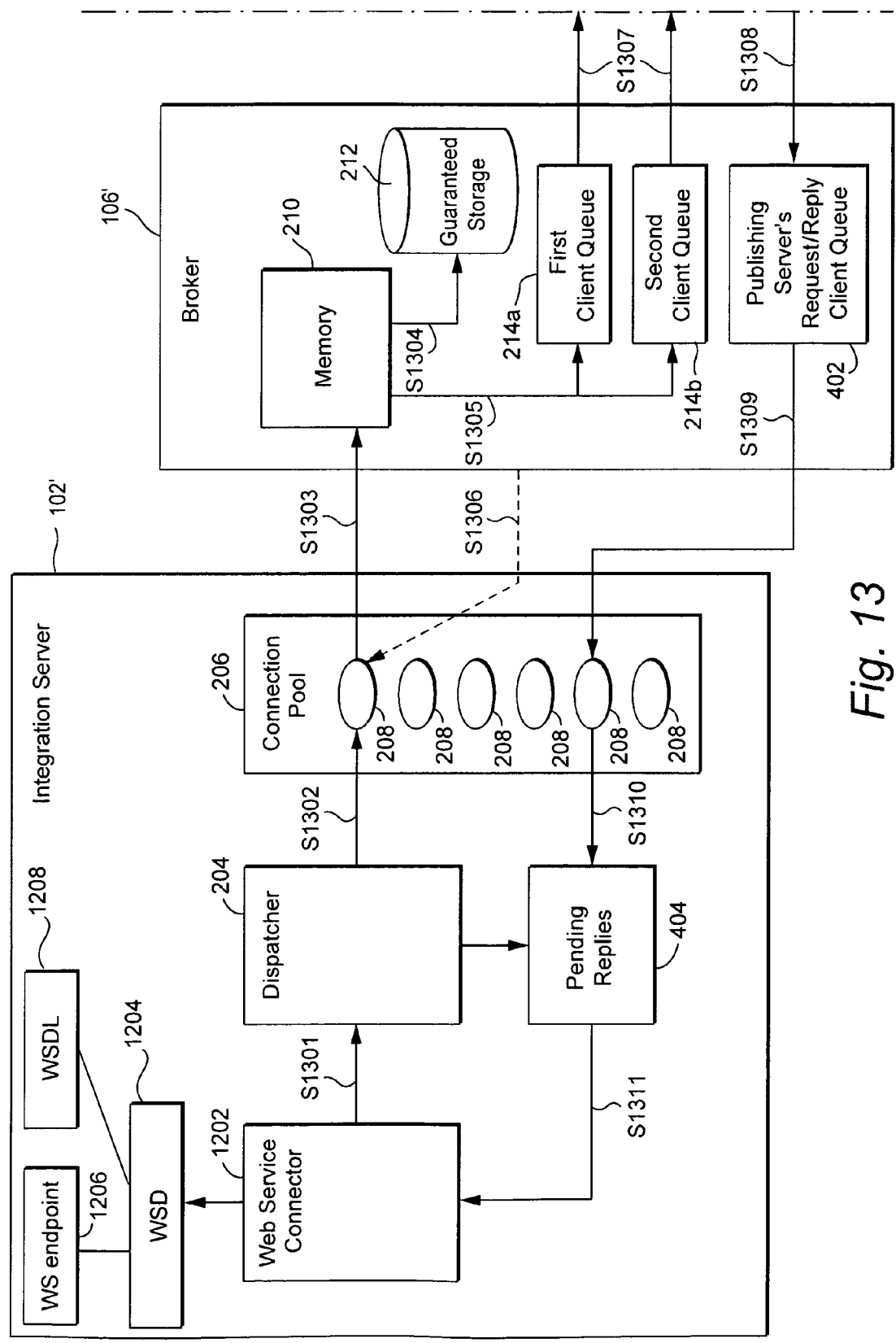
FIG. 13 is a block diagram that illustrates the "in-out" or "request-reply" message exchange pattern behavior of a message producer in accordance with an example embodiment.
Figure 14:
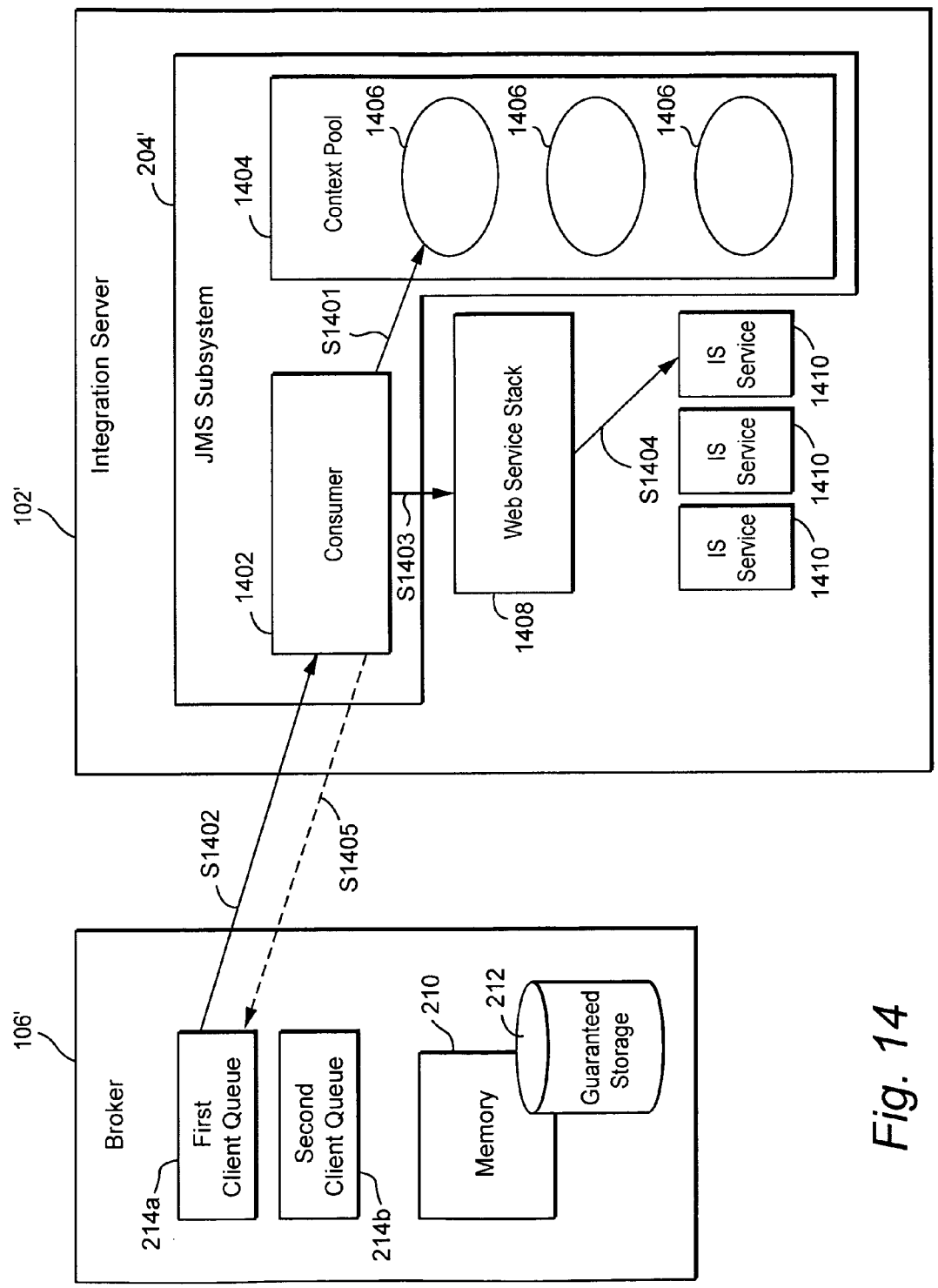
FIG. 14 is a block diagram that illustrates the behavior of a message consumer in accordance with an example embodiment.

FIGS. 12-14 illustrate in greater detail the interaction between the broker 106' and the integration server 102' of the application integration system 100'. In particular, FIG. 12 is a block diagram that illustrates the "in-only" message exchange pattern behavior of a message producer in accordance with an example embodiment. The block diagram shown in FIG. 12 is similar to that shown in FIG. 3. However, the publishing service 202 of FIG. 3 is replaced with a web service connector 1202 in FIG. 12. As alluded to above, in the FIG. 12 example embodiment, the web service connector 1202 is a message exchange pattern (MEP) "in-only" type connector. Thus, in the FIG. 12 example, messages are sent uni-directionally.

In brief, the web service connector 1202 of FIG. 12 may be generated from a Web Service Descriptor (WSD) 1204 in certain example embodiments. The WSD 1204, in turn, may be generated from a predefined or other Web Service Definition Language (WSDL) document 1208, and/or from an existing service (not shown) in certain example embodiments. Web service endpoints 1206 also may be specified and may have an impact on the WSD 1204 and, thus, the web service connector 1202. A more detailed description of each of these components, for both the provider and the consumer sides, consistent with certain example embodiments was provided above.

The actual flow shown in FIG. 12 is much the same as the flow shown in and described in connection with FIG. 3. Thus, similar to the above, the web service connector 1202 provided to the integration server 102' sends a document to the dispatcher 204 (or an adapter notification publishes a document when an event occurs on the resource the adapter monitors) (S1201). Before the integration server 102' sends the document to the dispatcher 204, it may validate the document against its publishable document type. If the document is not valid, the web service connector 1202 may return an exception specifying the validation error. If the dispatcher 204 detects that the broker 106' is not available as in this example, the document may be stored (S1202). For example, if the document is guaranteed, the dispatcher 204 routes the document to the outbound document store 302 (e.g., on disk). If the document is volatile, the dispatcher 204 discards the document and the publishing service 202 throws an exception. The integration server 102 executes the next step in the web service connector 1202.

When the integration server 102' re-establishes a connection to the broker 106', the integration server 102' obtains a single connection 208 from the connection pool 206 (S1203). The integration server 102' automatically sends the documents from the outbound document store 302 to the broker 106' (S1204). To empty the outbound document store 302 more rapidly, the integration server 102' may send the documents in batches instead of one at a time. It will be appreciated that the integration server 102' may use a single connection 208 to empty the outbound document store 302, for example, to preserve publication order.

The broker 106' examines the storage type for the document, determines that it is guaranteed, and stores the document in memory 210 and on disk 212 (S1205). The broker 106' routes the document to subscribers (S1206). If the document was published (e.g., broadcast), the broker 106' identifies subscribers and places a copy of the document in the client queue for each subscriber (e.g., both first and second client queues 214*a-b*). If the document was delivered, the broker 106' places the document in the queue for the client specified in the delivery request (e.g., either or both of first and second client queues 214*a-b*). If there are no subscribers for the document, the broker 106' returns an acknowledgement to the web service connector 1202 and then discards the document. If, however, a deadletter subscription exists for the document, the broker 106' deposits the document in the queue containing the deadletter subscription (e.g., either or both of first and second client queues 214*a-b*). A document remains in the queue (e.g., either or both of first and second client queues 214*a-b*) on the broker 106' until it is picked up by the subscribing client. If the time-to-live for the document elapses, the broker 106' discards the document. The time-to-live period may be predetermined, e.g., by the user. If the document is guaranteed, the broker 106' returns an acknowledgement to the dispatcher 204 to indicate successful receipt and storage of the document (S1206). The dispatcher 204 returns the connection 208 to the connection pool 206. The broker 106' returns an acknowledgement to the integration server 102' to indicate successful receipt and storage of the guaranteed document (S1207). The integration server 102' removes the document from the outbound document store 302.

If it is desirable to keep published documents from being placed in the outbound document store 302 when the broker 106' is unavailable, the integration server 102' may be configured to throw an exception instead. After the connection to the broker 106' is re-established, the integration server 102' may send all newly published documents (e.g., guaranteed and volatile) to the outbound document store 302 until the outbound store 302 has been emptied. This allows the integration server 102' to maintain publication order. After the integration server 102' empties the outbound document store 302, the integration server 102' may resume publishing documents directly to the broker 106'.

If the integration server 102' makes a predetermined number of attempts (e.g., 3, 4, 5, etc.) to transmit a document from the outbound document store 302 to the broker 106' and all attempts fail, an audit subsystem may log the document and assign it a status of "TOO MANY TRIES." If a transient error occurs while the integration server 102' publishes a document, the audit subsystem may log the document and assign it a status of "FAILED." It is possible to configure publishable document types and the integration server 102' so that the integration server 102' does not validate documents when they are published. A monitor may be used to find and resubmit documents with a status of "TOO MANY TRIES" or "FAILED."

FIG. 13 is a block diagram that illustrates the "in-out" or "request-reply" message exchange pattern behavior of a message producer in accordance with an example embodiment. The block diagram shown in FIG. 13 is similar to that shown in FIG. 4, except that the publishing service 202 of FIG. 4 is replaced with a web service connector 1202 in FIG. 13. Thus, the block diagram shown in FIG. 13 also is similar to that shown in FIG. 12, except that the web service connector 1202 is a MEP "in-out" type connector in the FIG. 13 example embodiment. Thus, in the FIG. 12 example, messages are sent bi-directionally.

The actual flow shown in FIG. 13 is much the same as the flow shown in and described in connection with FIG. 4. Thus, similar to the above, a web service connector 1202 sends a message (e.g., the request) to the dispatcher 204 (S1301). The integration server 102' populates a header in the message with a unique identifier that will be used to match up the reply message with this request. The web service connector 1202 enters into a waiting state. The web service connector 1202 will not resume execution until it receives a reply from a subscriber or the wait time elapses. The integration server 102' may begin tracking the wait time as soon as it publishes the message.

The dispatcher 204 obtains a connection from the connection pool 206 (S1302). The connection pool 206 is a reserved set of connections 208 that the integration server 102' uses to publish messages to the broker 106'. To publish a request message to the broker 106', the integration server 102' uses a connection 208 for the request/reply client. If the broker 106' is not available, the dispatcher 204 may route the message to the outbound message store 302, e.g., as described above. The dispatcher 204 sends the message to the broker 106' (S1303).

The broker 106' examines the storage type for the message to determine how to store the message (S1304). For example, if the message is volatile, the broker 106' stores the message in memory 210. If the message is guaranteed, the broker 106' stores the message in memory 210 and on disk 212. The broker 106' routes the message to subscribers (S1305). If the message was published (e.g., broadcast), the broker 106' identifies subscribers and places a copy of the message in the client queue for each subscriber (e.g., both first and second client queues 214*a-b*). If the message was delivered, the broker 106' places the message in the queue for the client specified in the delivery request (e.g., either or both of the first and second client queues 214*a-b*). If there are no subscribers for the message, the broker 106' returns an acknowledgement to the publisher 202 and then discards the message. If, however, a deadletter subscription exists for the message, the broker 106' deposits the message in the queue containing the deadletter subscription (e.g., either or both of first and second client queues 214*a-b*). A message remains in the queue (e.g., either or both of first and second client queues 214*a-b*) on the broker 106' until it is picked up by the subscribing client. If the time-to-live for the message elapses, the broker 106' discards the message. The time-to-live period may be predetermined, e.g., by the user. If the message is guaranteed, the broker 106' returns an acknowledgement to the dispatcher 204 to indicate successful receipt and storage of the message (S1306). The dispatcher 204 returns the connection 208 to the connection pool 206.

Subscribers retrieve and process the message (S1307). A subscriber uses a service (not shown) to compose and publish a reply message. This service automatically populates the header field of the reply message envelope with the same value used in the header field of the request message envelope. This service also automatically specifies the requesting client as the recipient of the reply message. One or more subscribers send reply messages to the broker 106' (S1308). The broker 106' stores the reply messages, e.g., in memory 210. The broker 106' places the reply messages in the request/reply client queue 402 for the integration server 102 that initiated the request.

The integration server 102' that initiated the request obtains a request/reply client from the connection pool 206 and retrieves the reply messages from the broker 106 (S1309). The integration server 102' uses the header value of the reply message to match up the reply with the original request (S1310). The integration server 102' places the reply message in the pipeline of the waiting service 404 (S1311). The waiting service resumes execution.

A SOAP document may be generated and wrapped in a JMS message with SOAP-JMS headers as the body of that JMS message when a reply message is requested. In other words, the JMS header information may be obtained and the data envelope of the JMS trigger may contain an appropriately generated SOAP formatted message.

All reply messages may or may not be treated as volatile documents, depending on the message header values. Volatile messages may be stored in memory 210 and may be lost if the resource on which the reply message is located shuts down or if a connection 208 is lost while the reply document is in transit.

If the wait time elapses before the service receives a reply, the integration server 102' may end the request, and the service may return a null message that indicates that the request timed out. The integration server 102' may execute the next step in the flow service. If a reply message arrives after the flow service resumes execution, the integration server 102' may reject the message and create a journal log message stating that the message was rejected because there is no thread waiting for the document.

Certain example embodiments are advantageous in that they allow synchronous communications (e.g., requests) over asynchronous technologies. For example, certain example embodiments are advantageous in that they allow multiple consumers to wait for the same message. A message can be published once but designated for multiple destinations. Messages therefore can be received in a load-balanced manner in certain example embodiments, e.g., thereby making the exact location of the backend sender largely irrelevant. Certain example embodiments also are advantageous in that they allow the above-described and/or other functionality to be implemented in an open and extendible configuration-driven manner.

FIG. 14 is a block diagram that illustrates the behavior of a message consumer in accordance with an example embodiment. In essence, FIG. 14 shows the path of a runtime message from the broker 106' to the consumer 1402 of the JMS subsystem 204' in the integration server 102', the invocation of an appropriate IS service 1410 through the web service stack 1408, and the return of an optional acknowledgement message. The process is described in greater detail below. However, it is noted that the components and flow shown in FIG. 14 represents the biggest difference between the "standard" JMS triggers described above (e.g., in connection with FIG. 5) and the SOAP-JMS triggers of certain example embodiments. Referring to FIG. 10, which is an illustrative block diagram representing a example messaging layer 1000, a separate trigger layer apart from the trigger layer 1004 for JMS triggers need not be provided for standards-based triggers having standards-based messages associated therewith. Thus, in certain example embodiments, SOAP-JMS triggers may route appropriately formatted messages through the trigger layer 1004 for JMS triggers. The common trigger facilities of the trigger subsystem 1002 also may be used for the SOAP-JMS triggers. However, as will be explained in greater detail below, rather than having the IS-JMS subsystem 1006 pass the messages to a JMS messaging API layer 914 or a proprietary messaging API layer 908, certain example embodiments may use the same or a separate subsystem 204' to strip the SOAP messages of their JMS headers to retrieve the SOAP message envelope. The extracted SOAP message envelope may then be passed to the web services stack 1408 so that the appropriate IS service ultimately may be invoked, e.g., via the SOAP message being passed to the SOAP stack.

The JMS subsystem 204' consumer 1402 (also sometimes called a trigger) uses a context 1406 from a context pool 1404 to retrieve a message. A context 1406 encapsulates the javax.jms.Session and javax.jmsMessageConsumer. Thus, a context 1406 maintains the status of a trigger and includes information as to how to retrieve a message from a particular provider. Advantageously, the use of a context 1406 from the context pool 1404 enables certain example embodiments to escape the strict JMS requirement that all JMS messages must be acknowledged when any one JMS messages is acknowledged. In other words, the use of a context 1406 from the context pool 1404 in certain example embodiments enables messages to be acknowledged one or more at a time, all at one time, or even not at all. It will be appreciated that the consumer or trigger may be multi-threaded in certain example embodiments.

The consumer or trigger 1402 fetches an appropriate context 1406 from the context pool 1404 (S1401), e.g., based on information included in the context information pertaining to, for example, the type of message, how to retrieve the message from the provider, etc. The context 1406 then may be used to retrieve the message from the message provider (e.g., from a JMS message provider) (S1402).

When a message is retrieved (following S1402), the consumer or trigger 1402 will extract the underlying message envelope from the message (e.g., the SOAP envelope from the JMS message), and pass the extracted message to the web service stack 1408 (S1403). In other words, the web service stack 1408 receives only the SOAP envelope in certain example embodiments and not the JMS message, the latter of which previously was removed by the consumer 1402. Accordingly, the web service stack 1408 is configured to invoke the appropriate IS service 1410 from the SOAP envelope without regard to the JMS trigger in certain example embodiments. The web service stack 1408 is then responsible for invoking an appropriate target IS service 1410 from a possible plurality of IS services 1410 (S1404). Thus, whereas the "standard" JMS trigger described above is responsible for routing messages to target services, the SOAP-JMS trigger of certain example embodiments relies on the web service stack 1408 to route the message to the appropriate target IS service 1410. This is a significant difference in operation between how the two types of triggers function, which also requires a significant change in the underlying system architecture as shown and described herein.

When the invoked target IS service 1410 has completed processing according to the extracted message, the consumer 1402 may acknowledge the same to the provider (S1405). For example, when the invoked target IS service 1410 has completed processing according to the extracted SOAP envelope, the consumer 1402 may acknowledge the same to the JMS provider. The particular acknowledgement model may be specified in the trigger configuration in certain example embodiments. For example, using JMS, the acknowledgement model may be a client acknowledgement model (e.g., by setting an appropriate trigger configuration field to "client" or the like), an automatic acknowledgement model (e.g., by setting an appropriate trigger configuration field to "auto" or the like), or a batched acknowledgement model (e.g., by setting an appropriate trigger configuration field to "dups ok" or the like).

When SOAP over JMS messages are implemented in connection with certain example embodiments, JMS parameters may be retrieved. For example, when the JMSTransportSender receives a request to send a message, it may be passed the message context. The first step to send the message may be to extract the JMS parameters from the message context. Thus, JMSTransportSender may look for the JMS URI in the MessageContext's TransportURI property. If nothing if found then it may look at MessageContext.getTo( ).getAddress( ). If the JMS URI is not found, it may look at the OutTransportInfo property to find the JMSTransportSenderInfo class. The JMSTransportSenderInfo class may contain the connection parameters and message header parameters needed to create and send the SOAP-JMS message.

As indicated above, when sending a message, the contents of the JMS message body may include the SOAP payload as a JMS BytesMessage or TextMessage. In certain example embodiments, in the case of a message without any attachments, the JMS message body may contain the properly encoded bytes of the XML SOAP message, and nothing else. In this case the Content-type will be "text/xml" (for SOAP 1.1) or "application/soap+xml" (for SOAP 1.2). In the case that there are attachments, the JMS message body may contain a multipart MIME message. The first thing encountered in byte stream may be the MIME boundary for the start of the first part. The message may be encoded using XOP [SOAP11-MTOM] [SOAP12-MTOM] with a Content-type of "multipart/related."

As alluded to above, when sending a message in certain example embodiments, the contents of the JMS message header and properties may be populated based on rules set forth in the SOAP over JMS 1.0 specification sections 2.7 and 2.8, the entire contents of which are hereby incorporated herein by reference. Of course, other standards-based binding specifications also may be used in connection with certain example embodiments.

It will be appreciated that as used herein, the terms system, subsystem, service, programmed logic circuitry, and the like may be implemented as any suitable combination of software, hardware, firmware, and/or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An application integration system having one or more processors and configured to exchange messages via a message broker, comprising:
    a message consumer configured to receive a runtime message from a message producer via a client queue of the message broker in accordance with a context retrieved from a context pool, the message consumer being configured to use a transport protocol and having a message envelope associated therewith, the message envelope being formatted in accordance with a second messaging protocol, a runtime trigger configured to use the transport protocol to receive the message envelope, extract the message envelope from the runtime message, and transmit the message envelope that is formatted according to the second messaging protocol; and
    a web service stack configured to receive, via the one or more processors, the transmitted message envelope extracted by the runtime trigger by the message consumer and further configured to invoke an appropriate service from a plurality of possible services in accordance with instructions included with the message envelope.

2. The system of claim 1, wherein the runtime trigger is further configured to acknowledge receipt of the runtime message after the at least one appropriate service is invoked by sending an acknowledgement message to the message producer via the message broker.

3. The system of claim 2, wherein a plurality of acknowledgement messages are sent to the message producer in batch.

4. The system of claim 1, wherein the runtime trigger is a JMS trigger.

5. The system of claim 1, wherein the second messaging protocol is SOAP.

6. The system of claim 1, wherein the runtime trigger is configured to receive a SOAP message envelope over a JMS transport protocol.

7. The system of claim 1, wherein the runtime trigger further comprises header information comprising a name of a destination to which a response message should be sent, a priority associated with the runtime trigger, an indication as to whether the runtime trigger is persistent, and/or a lifetime of the runtime trigger.

8. The system of claim 1, wherein the runtime trigger is associated with a web service descriptor (WSD) at design time.

9. The system of claim 8, wherein the WSD is created from a web service definition language (WSDL) document.

10. The system of claim 9, wherein the runtime trigger includes header information regarding how the WSDL document is to be interpreted.

11. An application integration system configured to exchange messages via a message broker, comprising:
    a web service connector configured to invoke a remote web service using a runtime trigger by generating a runtime message to be delivered to a message consumer through a client queue of the message broker, the runtime message being sent over a transport protocol and having a message envelope associated therewith, the message envelope being formatted in accordance with a second messaging protocol, and the runtime trigger configured to use the transport protocol to receive the message envelope, extract the message envelope from the runtime message, and transmit the message envelope that is formatted according to the second messaging protocol; and
    a dispatcher configured to receive the runtime message from the web service connector and send the runtime message to the broker via a connection retrieved from a connection pool, wherein:
    the web service connector is generated from a web service descriptor (WSD),
    the WSD specifies at least a format of the runtime message envelope, as well as a destination, and the message broker is configured to place any received runtime messages into the client queue for the message consumer.

12. The system of claim 11, wherein the message broker is further configured to return acknowledgement messages received from the message consumer to the web service connector via one of the connections in the connection pool.

13. The system of claim 11, wherein the runtime trigger is a JMS trigger.

14. The system of claim 11, wherein the second messaging protocol is SOAP.

15. The system of claim 11, wherein the web service connector is configured to transport a SOAP message envelope over a JMS transport protocol.

16. The system of claim 11, wherein the WSD is generated from a predefined Web Service Definition Language (WSDL) document.

17. The system of claim 16, wherein the WSDL document describes web services that are accessible over a network, including information the web service connector needs to send data to, invoke, and receive data from, the web service.

18. The system of claim 11, wherein the web service connector is generated based at least in part on one or more web service endpoints.

19. An application integration system configured to exchange messages via a message broker, comprising:
a web service connector configured to invoke a remote web service using a runtime trigger by generating a runtime message to be delivered to a message consumer through a client queue of the message broker, the runtime message being sent over a transport protocol and having a message envelope associated therewith, the message envelope being formatted in accordance with a second messaging protocol, and the runtime trigger configured to use the transport protocol to receive the message envelope, extract the message envelope from the runtime message, and transmit the message envelope that is formatted according to the second messaging protocol; and
a dispatcher configured to receive the runtime message from the web service connector and send the runtime message to the broker via a connection retrieved from a connection pool, wherein:
the message consumer is configured to receive the runtime message from the producer in accordance with a context retrieved from a context pool,
a runtime trigger is configured to extract the message envelope from the runtime message; and
a web service stack is configured to receive the message envelope extracted by the runtime trigger and further configured to invoke an appropriate service from a plurality of possible services in accordance with instructions included with the message envelope,
the web service connector is generated from a web service descriptor (WSD) at design time, the WSD specifying at least a format of the runtime message envelope, as well as a destination, and
the message broker is configured to place any received runtime messages into the client queue for the message consumer.

20. The system of claim 19, wherein the message envelope is a SOAP message envelope, the runtime trigger is a JMS trigger, and the SOAP message envelope is sent over a JMS transport to or from the JMS trigger.

21. In an application integration system, a messaging method comprising:
providing a message broker configured to deliver messages from a message producer to a message consumer;
enabling a web service connector, the web service connector being configured to invoke a remote web service in communication with the message consumer using a runtime trigger by generating a runtime message to be delivered to the message consumer through a client queue of the message broker;
sending, via a dispatcher connected to the web service connector, the runtime message to the message broker using a connection retrieved from a connection pool, the runtime message being sent over a transport protocol and having a message envelope associated therewith, the message envelope being formatted in accordance with a second messaging protocol and the runtime trigger configured to use the transport protocol to receive the message envelope;
receiving, at the message consumer, the runtime message from the producer via the broker in accordance with a context retrieved from a context pool;
extracting the message envelope from the runtime message;
passing the message envelope, formatted according to the second messaging protocol, from the message consumer to a web service stack; and
invoking, via the web service stack, an appropriate service from a plurality of possible services operably connected to the web service stack in accordance with instructions included with the message envelope,
wherein the message broker is configured to place any received runtime messages into the client queue for the message consumer.

22. The method of claim 21, wherein the message envelope is a SOAP message envelope, the runtime trigger is a JMS trigger, and the SOAP message envelope is sent over a JMS transport to or from the JMS trigger.

23. The method of claim 21, further comprising generating the web service connector from a web service descriptor (WSD) at design time, the WSD specifying at least a format of the runtime message envelope, as well as a destinition.

24. The method of claim 23, further comprising generating the WSD at design time from a predefined Web Service Definition Language (WSDL) document and/or one or more web service endpoints,
wherein the WSDL document describes web services that are accessible over a network, including information the web service connector needs to send data to, invoke, and receive data from, the web service.

25. The method of claim 21, further comprising acknowledging receipt of the transported message through the message broker following the invoking of and/or processing by the at least one appropriate service.

* * * * *